(12) United States Patent
Michael et al.

(10) Patent No.: US 10,178,100 B2
(45) Date of Patent: Jan. 8, 2019

(54) OPERATING-SYSTEM-LEVEL ISOLATION OF MULTI-TENANT APPLICATIONS

(71) Applicant: Oracle International Corporation, Redwood Shores, CA (US)

(72) Inventors: Nicolas Michael, San Francisco, CA (US); Yixiao Shen, San Ramon, CA (US); Glenn Faden, San Rafael, CA (US)

(73) Assignee: Oracle International Corporation, Redwood Shores, CA (US)

( * ) Notice: Subject to any disclaimer, the term of this patent is extended or adjusted under 35 U.S.C. 154(b) by 210 days.

(21) Appl. No.: 15/013,268

(22) Filed: Feb. 2, 2016

(65) Prior Publication Data

US 2017/0111365 A1    Apr. 20, 2017

Related U.S. Application Data

(60) Provisional application No. 62/241,834, filed on Oct. 15, 2015.

(51) Int. Cl.
*G06F 9/00* (2006.01)
*G06F 21/53* (2013.01)
*H04L 29/06* (2006.01)
*G06F 9/54* (2006.01)

(52) U.S. Cl.
CPC ............ *H04L 63/102* (2013.01); *G06F 9/545* (2013.01); *G06F 21/53* (2013.01); *H04L 63/0209* (2013.01)

(58) Field of Classification Search
CPC .................................................. H04L 63/102
See application file for complete search history.

(56) References Cited

U.S. PATENT DOCUMENTS

| 2009/0216768 A1* | 8/2009 | Zwilling ............ G06F 17/30557 |
| 2016/0104005 A1* | 4/2016 | Toussaint ............ G06F 21/6218 707/783 |

* cited by examiner

*Primary Examiner* — Alexander Lagor
*Assistant Examiner* — Syed M Ahsan
(74) *Attorney, Agent, or Firm* — Trellis IP Law Group, PC

(57) ABSTRACT

Implementations of PDB Sandboxing in layers and mapping to different operating systems are described. In exemplary implementations, one or more pluggable databases (PDBs) are encapsulated on common container databases to form one or more PDB sandboxes. Encapsulating PDBs forms an isolation boundary layer configured to dynamically regulate security and isolation of the PDB sandboxes. Access by processes and resources to and from the PDBs inside respective PDB sandboxes through the isolation boundary layer, and access within PDB sandboxes, is regulated using dynamic access processes that dynamically vary access to resources and process disposed within and external to the PDB sandboxes.

20 Claims, 22 Drawing Sheets

| Permissions of Y wrt X | BG PQ JQ FG | PQ$_A$ JQ$_A$ | PQ$_B$ JQ$_B$ | FG$_A$ | FG$_B$ | P SSH | P$_A$ | P$_B$ | Sandbox A | Sandbox B | Res Acct & Mgmt |
|---|---|---|---|---|---|---|---|---|---|---|---|
| BG PQ JQ FG | see signal debug IPC  216A | see signal debug IPC  216B | see signal debug IPC  216C | see signal debug IPC  216D | see signal debug IPC  216E | see signal debug IPC  216F | see signal debug IPC  216G | see signal debug IPC  216H | enter leave admin  216I | enter leave admin  216J | 214A |
| PQ$_A$ JQ$_A$ | see? signal debug IPC  218A | see signal debug IPC  218B | see? signal debug IPC  218C | see? signal debug IPC  218D | see? signal debug IPC  218E | see? signal debug IPC  218F | see signal debug IPC  218G | see signal debug IPC  218H | enter leave admin  218I | enter leave admin  218J | Sbx A  214B |
| PQ$_B$ JQ$_B$ | see? signal debug IPC  220A | see? signal debug IPC  220B | see? signal debug IPC  220C | see? signal debug IPC  220D | see signal debug IPC  220E | see signal debug IPC  220F | see signal debug IPC  220G | see signal debug IPC  220H | enter leave admin  220I | enter leave admin  220J | Sbx B  214C |
| FG$_A$ | see? signal debug IPC  222A | see? signal debug IPC  222B | see? signal debug IPC  222C | see signal debug IPC  222D | see? signal debug IPC  222E | see? signal debug IPC  222F | see signal debug IPC  222G | see signal debug IPC  222H | enter leave admin  222I | enter leave admin  222J | Sbx A  214D |
| FG$_B$ | see? signal debug IPC  224A | see? signal debug IPC  224B | see? signal debug IPC  224C | see? signal debug IPC  224D | see signal debug IPC  224E | see signal debug IPC  224F | see signal debug IPC  224G | see signal debug IPC  224H | enter leave admin  224I | enter leave admin  224J | Sbx B  214E |
| P | see signal debug IPC  226A | see signal debug IPC  226B | see signal debug IPC  226C | see signal debug IPC  226D | see signal debug IPC  226E | see signal debug IPC  226F | see signal debug IPC  226G | see signal debug IPC  226H | enter leave admin  226I | enter leave admin  226J | 214F |
| SSHD | see signal debug IPC  228A | see signal debug IPC  228B | see signal debug IPC  228C | see signal debug IPC  228D | see signal debug IPC  228E | see signal debug IPC  228F | see signal debug IPC  228G | see signal debug IPC  228H | enter leave admin  228I | enter leave admin  228J | 214G |
| P$_A$ | see signal debug IPC  230A | see signal debug IPC  230B | see signal debug IPC  230C | see signal debug IPC  230D | see signal debug IPC  230E | see signal debug IPC  230F | see signal debug IPC  230G | see signal debug IPC  230H | enter leave admin  230I | enter leave admin  230J | Sbx A  214H |
| P$_B$ | see? signal debug IPC  232A | see signal debug IPC  232B | see signal debug IPC  232C | see signal debug IPC  232D | see signal debug IPC  232E | see signal debug IPC  232F | see signal debug IPC  232G | see signal debug IPC  232H | enter leave admin  232I | enter leave admin  232J | Sbx B  214I |

 Green
 Red

FIG. 2

| Permissions of Y wrt X | DBF$_{CDB}$ | DBF$_A$ | DBF$_B$ | DBF$_{all}$ | FS$_{cdb}$ | FS$_A$ | FS$_B$ | FS$_{all}$ | |
|---|---|---|---|---|---|---|---|---|---|
| BG PQ JQ FG | create delete access 316A | create delete access 316B | create delete access 316C | create delete access 316D | create delete access 316E | create delete access 316F | create delete access 316G | create delete access 316H | ← 316 |
| PQ$_A$ JQ$_A$ | create delete access 318A | create delete access 318B | create delete access 318C | create delete access 318D | create delete access 318E | create delete access 318F | create delete access 318G | create delete access 318H | ← 318 |
| PQ$_B$ JQ$_B$ | create delete access 320A | create delete access 320B | create delete access 320C | create delete access 320D | create delete access 320E | create delete access 320F | create delete access 320G | create delete access 320H | ← 320 |
| FG$_A$ | create delete access 322A | create delete access 322B | create delete access 322C | create delete access 322D | create delete access 322E | create delete access 322F | create delete access 322G | create delete access 322H | ← 322 |
| FG$_B$ | create delete access 324A | create delete access 324B | create delete access 324C | create delete access 324D | create delete access 324E | create delete access 324F | create delete access 324G | create delete access 324H | ← 324 |
| P | create delete access 326A | create delete access 326B | create delete access 326C | create delete access 326D | create delete access 326E | create delete access 326F | create delete access 326G | create delete access 326H | ← 326 |
| SSHD | create delete access 328A | create delete access 328B | create delete access 328C | create delete access 328D | create delete access 328E | create delete access 328F | create delete access 328G | create delete access 328H | ← 328 |
| P$_A$ | create delete access 330A | create delete access 330B | create delete access 330C | create delete access 330D | create delete access 330E | create delete access 330F | create delete access 330G | create delete access 330H | ← 330 |
| P$_B$ | create delete access 332A | create delete access 332B | create delete access 332C | create delete access 332D | create delete access 332E | create delete access 332F | create delete access 332G | create delete access 332H | ← 332 |

310 → (Permissions column)
300 (table)
312 (header row)

 Green
 Red

FIG. 3

1210A → [A] Cannot see, signal, or debug
1210B → [B] Cannot see or signal, but can debug
1210C → [C] Can see, signal, and debug
1210D → [D] Can see, but not signal or debug Sandbox Labels *

- 1 label per sandbox using disjoint compartment bits

|  | Sandbox A | Sandbox B | Sandbox C |
  |---|---|---|---|
  | Label Name | CDB sandboxA | CDB sandboxB | CDB sandboxC |
  | Compartment Bits | 0000000001 | 0000000010 | 0000000100 |

- 1 label containing the compartment bits of all sandbox labels (for simplified labeling)

|  | All Sandboxes |
  |---|---|
  | Label Name | CDB sandboxALL |
  | Compartment Bits | 0001111111 |

← Classification CDB (1 per CDB)

- 3 labels for the CDB's private and common data files and file system

|  | CDB-private DBF | CDB-common DBF | CDB-private FS |
  |---|---|---|---|
  | Label Name | CDB DBFcdb | CDB DBFall | DBF FScdb |
  | Compartment Bits | 1000000000 | 0100000000 | 0010000000 |

- 1 label for common files using classif. *ADMIN_LOW* (level 0) with no compartment bits
- 1 label for root privileges using classification *ADMIN_HIGH* with no compartment bits

FIG. 18

Sandbox Labels and Clearences

| Files | Label | Owner (pemission) |
|---|---|---|
| $DBF_{cdb}$ | CDB DBFcdb | owner:dba (770) |
| $DBF_A$ | CDB sandboxA | owner:dba (770) |
| $DBF_B$ | CDB sandboxB | owner:dba (770) |
| $DBF_{all}$ | CDB DBFall | owner:dba (770) |
| $FS_{cdb}$ | CDB DBFcdb | owner:dba (770) |
| $FS_A$ | CDB sandboxA | {owner,sbxA}:tenants |
| $FS_B$ | CDB sandboxB | {owner,sbxB}:tenants |
| $FS_{all}$ | ADMIN_LOW | |

| Process | Clearance | uid |
|---|---|---|
| BG PQ JQ FG | CDB sandboxALL DBFcdb DBall FScdb | owner |
| $PQ_A$ $JQ_A$ | c DBFall FScdb | owner |
| $PQ_B$ $JQ_B$ | CDB sandboxB DBFall FScdb | owner |
| $FG_A$ | CDB sandboxA DBFall | owner |
| $FG_B$ | CDB sandboxB DBFall | owner |
| SSHD | ADMIN_HIGH | root |
| P | Unspecified | |
| $P_A$ | CDB sandboxA | sbxA |
| $P_B$ | CDB sandboxB | sbxB |

FIG. 19

OPERATING-SYSTEM-LEVEL ISOLATION OF MULTI-TENANT APPLICATIONS

This application claims the benefit of provisional patent Application Ser. No. 62/241,834, entitled OPERATING-SYSTEM-LEVEL ISOLATION OF MULTI-TENANT APPLICATIONS, filed on Oct. 15, 2015, which is hereby incorporated by reference, as if it is set forth in full in this specification:

BACKGROUND

The following relates to multitenant access to databases, processes, and memory. More specifically, implementations relate to providing isolation between tenants of multi-tenant applications.

Consolidation or Cloud-based deployment of applications may be done in many different ways, typically based on virtualization on some layer of a stack. Virtualization technologies typically operate on the hardware layer (traditional virtual machines), operating system layer (container databases), or application layer (in-application virtualization or multi-tenant applications).

While hardware virtualization generally provides the best isolation with respect to security and performance, it also generally provides the lowest density and least efficiency. In contrast, in-application virtualization generally provides better manageability ("manage many-as-one"), density, efficiency, and elasticity, but does not provide the same level of isolations as Virtual Machines (VM). Unfortunately, end users have to choose between either one of them, which means selecting between efficiency and security isolation.

Currently, Pluggable Database (PDB) consolidation models have been introduced to help solve the efficiency issues of conventional consolidation models. Efficiency gains result from the aggregation of work across multiple PDBs in shared background processes of the CDB (e.g., log writer and database writer) and sharing of SGA memory. Additionally, PDBs do not require any partitioning of physical resources as needed for instance-based consolidation (memory—dedicated SGA) or VMs (memory, grid disks, and eventually CPU), but share these resources on demand. Their footprint is much lower than that of instances or VMs, resulting in much higher density of PDBs, allowing PDBs to react more dynamically to load changes.

Performance studies show that a PDB consolidation model is far more efficient than instance-based consolidation of Non-Container Databases (non-CDBs), or even the deployment of databases inside virtual machines (VMs). Unfortunately, while conventional PDBs consolidation models have higher efficiency, they generally lack the level of isolation (i.e. security and performance isolation) typically provided by VMs. For example, database foreground processes run as the same UNIX user ID without access control to memory, files, storage and network devices or other processes enforced by the Operating System (OS). Such lack of isolation allows database tenants who gain access to the OS, or are able to inject malicious code in a database session, to access data, trace files, network packets and processes of other tenants.

Moreover, current PDBs do not provide mechanisms to allow secure access to the operating system (OS) of the database server hosting the PDB, which restricts access. This limits database tenants from performing common tasks such as directly accessing trace files, staging data through external tables, running their own scripts or monitoring tools, etc.

Therefore, a new and improved system and method for consolidating PDBs is desired to overcome the above.

SUMMARY

Exemplary implementations herein describe technologies by which tenants (i.e., end users) of multi-tenant applications can be isolated from each other through the use of Pluggable Databases (PDBs) which are consolidated inside Container Databases (CDB). For example, in one implementation PDBs are encapsulated within a CDB forming a PDB sandbox. In an implementation, the PDB sandbox provides tenants the ability to share resources using unique permission processes and systems configured to provide efficient and flexible performance similar to conventional PDBs, while providing security, performance, and operational feel of Virtual Machines (VMs).

Implementations include controlling resource access to, from, and between one or more pluggable databases that are encapsulated on a CDB. A PDB sandbox is formed by establishing a container database and encapsulating at least one pluggable database at least partially within the container database. Encapsulating the PDB forms an isolation boundary layer of the PDB sandbox. A dynamic access process such as an access matrix and/or access process is configured to determine whether an object on one side of the isolation boundary layer may pass through the isolation boundary layer and/or interact with another object disposed on the same side, or opposite side of the isolation boundary layer. In response to an object request to pass through the isolation boundary layer, or interact with another object through the isolation boundary layer, the access matrix and/or access process is used to dynamically determine whether the object may pass through or interact with the other object through the isolation boundary layer of the PDB sandbox.

Implementations may be applied to other operating system as well as databases or applications. For example SQL Server database and the operating system may utilize implementations described herein to enhance security for databases and Cloud based database implementations.

A further understanding of the nature and the advantages of particular embodiments disclosed herein may be realized by reference of the remaining portions of the specification and the attached drawings.

BRIEF DESCRIPTION OF THE DRAWINGS

FIG. 2 is a high level illustration of an access permission matrix for a process.

FIG. 3 is a high level illustration of an access permission matrix for files.

FIG. 18 is a high level illustration of label schemes for PDB Sandboxing.

FIG. 19 is a high level illustration of example labels and clearances for PDB Sandboxing.

DETAILED DESCRIPTION

Exemplary implementations of herein describe technologies by which tenants (i.e., end users) of multi-tenant applications are isolated from each other through permission systems and processes associated with one or more PDB sandboxes, herein referred to as PDB Sandboxing. In one implementation, PDB sandboxes are formed by encapsulating on or more PDBs within one or more CDBs. The encapsulation of the PDBs forms an isolation boundary layer which is used to regulate which resources access, processes, signals, and the like have access to processes, files, etc. located internal or external to the PDB sandboxes. To ensure isolation, a dynamic access process such as an access matrix and/or access process associated with each PDB sandbox is used to control which processes associated with a particular sandbox may enter, leave, or remain within the PDB sandbox.

Figure 1:
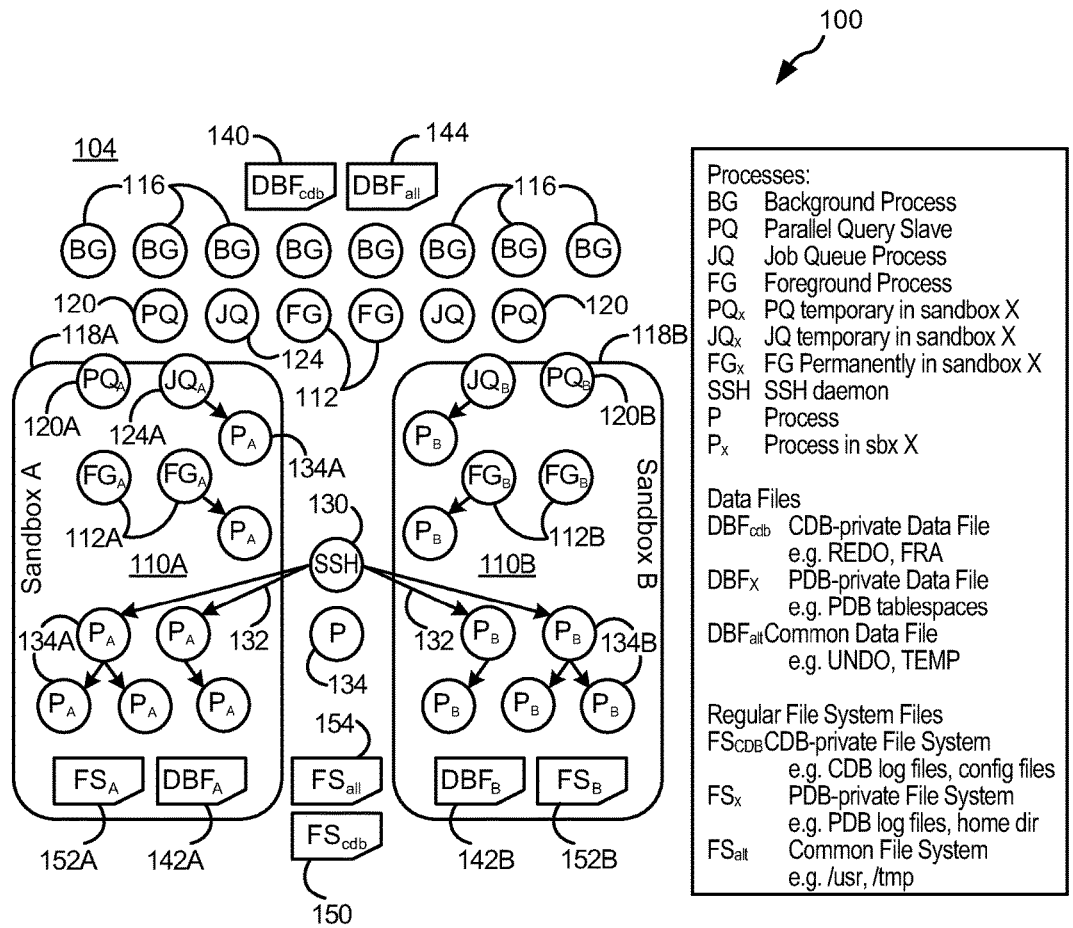
FIG. 1 is a high level illustration of an exemplary multitenant system PDB sandbox schema.

FIG. 1 is a high level illustration of an exemplary multitenant system 100. Multitenant system 100 represents a process schema designed to dynamically regulate and isolate processes and data file access external to, internal to, and between PDB sandboxes 110. In one implementation, multitenant system 100 includes common container database (CDB) 104 configured to provide at least some core database functionality supporting one or more PDB sandboxes 110, such as PDB sandboxes 110A and 110B. CDB 104 may be configured to provide such core database functionality as described in "Oracle Multitenant on SuperCluster T5-8: Scalability Study" published April 2014, hereby incorporated by reference as if set forth in full in this application for all purposes. CDB 104 may also provide a System Global Area (SGA) defining shared memory to which a plurality of database processes attach and which may consist of a single or a set of Optimized Shared Memory (OSM) segments.

In an exemplary implementation, PDB sandboxes 110 may be formed by encapsulating one or more PDBs within a respective CDB 104. Analogous with other types of databases, a PDB may be defined as a set of physical files on disk. A PDB may also be defined as a database instance defined as a set of memory structures and processes that manage database files and serves the users of the database.

In exemplar implementations, PDBs may be configured as portable, self-contained databases having their own schemas, schema objects, and non-schema objects, stored in individual data files such as PDB SYSTEM, SYSAUX, USER tablespaces and associated PDB data files. In addition, a root container database (e.g., CDB$ROOT) provides shared database dictionary structures, System Global Area (SGA) memory and background processes 112 as described herein.

For a multiple CDB 104 deployment, each PDB sandbox 110 may be established as a private instance respective to a particular CDB 104. In some implementations, PDB sandbox 110 may be created by assigning one or more PDBs to a particular PDB sandbox 110. For example, a particular PDB sandbox 110 may be created when a PDB associated with a PDB sandbox 110 is opened on a node, and may be stopped once the last PDB associated with the PDB is closed. In addition, PDB sandboxes 110 may be modeled through OS credentials inside a database. PDBs are assigned to OS credentials in order to associate them with a PDB sandbox 110.

When PDB sandboxes 110 are enabled for a CDB instance, each PDB sandbox 110 with OS Credentials assigned is associated with a PDB sandbox 110. PDB sandboxes 110 may also be enabled or disabled for a database instance through the setting of an initialization parameter. In order to support isolation between multiple CDB instances on the same host, the CDB instance may bind itself to a CDB-level sandbox 110 during instance startup, for example, using the name of the database instance.

PDB Sandboxes 110 may be automatically or manually created, for example, by a system administrator prior to the creation of OS credentials in the database. In an example, an OS credential may be created in the database through:

```
DBMS_CREDENTIAL.CREATE_CREDENTIAL (
    credential_name   IN  VARCHAR2,
    username          IN  VARCHAR2,
    password          IN  VARCHAR2,
    database_role     IN  VARCHAR2 DEFAULT NULL
    windows_domain    IN  VARCHAR2 DEFAULT NULL,
    comments          IN  VARCHAR2 DEFAULT NULL,
    enabled           IN  BOOLEAN DEFAULT TRUE);
For example, to create an OS credential with name "XYZ", OS user "xyz", and password "secret123 ":
    SQL>
    BEGIN
      dbms_credential.create_credential('XYZ', 'xyz', 'secret123',
NULL, NULL, 'Sandbox for xyz', TRUE);
    END;
    /
```

In exemplary implementations, PDB sandboxes 110 may be automatically created by the database when a DBA creates an OS credential. For this, example parameters such as "c_sandbox" and c_user for c_credential may be used, which specify whether or not the associated PDB sandbox 110 and/or OS user may be created. For example:

```
DBMS_CREDENTIAL.CREATE_CREDENTIAL (
    credential_name  IN  VARCHAR2,
    username         IN  VARCHAR2,
    password         IN  VARCHAR2,
```

-continued

```
database_role   IN  VARCHAR2 DEFAULT NULL
windows_domain  IN  VARCHAR2 DEFAULT NULL,
comments        IN  VARCHAR2 DEFAULT NULL,
enabled         IN  BOOLEAN DEFAULT TRUE,
c_sandbox       IN  BOOLEAN DEFAULT FALSE,
c_user          IN  BOOLEAN DEFAULT FALSE );
```

If c_sandbox=true, the database may be configured to automatically create a PDB sandbox 110 with the name specified as credential_name and assigns the CDB's sandbox as parent PDB sandbox 110. If c_user=true, it additionally creates the specified OS user with the specified password. If c_sandbox=false, the database may use an existing PDB sandbox 110 and OS user and not create the PDB sandbox 110.

Each PDB sandbox 110 may be considered a unit of isolation, which may contain 0, 1, or multiple PDBs associated with the same CDB 104. In other implementations, if multiple PDBs are closely related and do not require mutual isolation among themselves in terms of security and resources, they may be assigned to the same PDB sandbox 110.

PDB sandboxes 110 may be identified through unique names. In some implementations, for example, the database and/or system administrator provides sandbox names across CDBs 104, for example by prefixing them with the CDB name. In addition, PDB sandboxes 110 may be administrated through virtually any interface, for example through SQL commands and packages, resource manager plans, and initialization parameters. In some implementations, PDB sandboxes 110 may be administered through the use of Relational Database Management Systems (RDBMS), where information or provisioning of PDB sandboxes 110 may be been pushed down to the operating system (OS) rather than requiring database or system administrators to perform administration tasks using the OS.

In exemplary implementations, PDB sandboxes 110, such as PDB sandboxes 110A and 110B, may be configured to access resources within their own PDB sandbox 110, as well as share resources accessed through a plurality of defined interfaces and processes that, for example, run database server code. A database instance may use some processes, some of which are described herein, to implement supplementary database functionality, which may or may not be not directly related to individual user sessions, such as asynchronous flushing of data blocks, writing and archiving of redo logs, and monitoring of other database processes.

In an exemplary implementation, multitenant system 100 represents an illustrative schema for dynamic regulating resources, processes, communication, operations, and the like, external and internal to PDB sandboxes 110. For example, to provide multitenant isolation, multitenant system 100 may be configured to dynamically regulate the flow of processes, instructions, operations, calls, etc., into and out of PDB sandboxes 110, such as foreground processes 112 (FG), background processes 116 (BG), parallel query slave operations 120 (PQ), job queue processes 124 (JQ), Secure Shell daemons 130 (SSHD), other processes 134 (P), CDB-private data files 140 ($DBF_{cdb}$), PDB-private data files (142), common data files 144 ($DBF_{all}$), CDB-private system files 150 ($FS_{cab}$), PDB-private system files 152 ($FS_C$), and common system files 154 ($FS_{all}$), with respect to PDB sandboxes 110A and 110B.

Foreground processes 112 are generally associated with user sessions. For example, database instances may create foreground processes 112 to handle requests of a common user connected to the root container in the CDB instance, or foreground processes 112A or 112B to handle requests of a local user connected to a sandboxed PDB directly, and to perform actions such as parsing, running SQL statements issued through an application, read data blocks from data files on disk into the shared database buffers of the SGA, and the like. If the data blocks are not already present in the SGA the foreground processes 112, such as foreground processes 112A and 112B, may return results to the application for processing. In some implementations, foreground processes 112, such as foreground processes 112A and 112B, may be created by listener processes responsive to client process commands to connect to the instance, by Cluster Monitoring (CMON) background processes, and the like. While, foreground processes 112 generally reside outside PDB sandbox 110, foreground processes 112 may switch into the associated PDB sandbox 110 when then common user session switches into the corresponding PDB to perform operations like queries inside the PDB. Illustratively, foreground processes 112A and 112B may be processes of common user session that have temporarily entered PDB sandboxes 110A or 110B, respectively, or may be processes of local user sessions to PDBs of sandboxes 110A or 110B and reside permanently inside PDB sandbox 110A and 110B, respectively.

Background processes 116 typically reside outside PDB sandboxes 110. For example, background processes 116 such as log writer (LGW), database writer (DRW), process monitor (PMON), and the like generally perform background functionality at the root container level and may not execute code specifically for a PDB sandbox 110.

Other processes 134, such as non-database process, multi-threaded processes, and the like may be may reside externally or internally to PDB sandboxes 110. Similarly, parallel query slave processes 120 generally reside outside of PDB sandbox 110 after process creation. However, parallel query slave operations 120 may switch into the sandbox of the PDB sandbox 110 for which they are executing a query, and leave this PDB sandbox 110 again when switching back to a root container. For example, parallel query slave operations 120A generally reside outside PDB sandbox 110A when created, but may enter PDB sandbox 110A when executing a query associated with PDB sandbox 110A, and then leave PBD sandbox 110A upon completion of the query.

Job queue processes 124 may reside outside of PDB sandboxes 110 after process creation, but when executing a job on behalf of a PDB sandbox 110, may switch into the PDB sandbox 110. For example, job queue process 120 may reside outside PDB sandbox when created, and then move inside PDB sandbox 110A as job queue process 120A.

Data files such as private data files 140, PDB private data files 142, and common data files 144 may be private to the CDB 104 and are usually only accessed by background processes outside of PDB sandboxes 110 (e.g., REDO logs), private to a PDB, or shared, and accessed from common as well as other PDB processes. Other system files, such as common file system files 152 may belong to the CDB 104, a PDB, or be general files accessed by both CDB 104 and PDBs.

In some implementations, database data files such as private data files 140, PDB private data files 142, common data files 144, and the like, may reside external or internal to PDB sandboxes 110 as part of a local file system, a shared file system (e.g. mounted over a Network File System (NFS)), a local or shared block device (e.g. accessed through Fibre Channel), on storage servers accessed through RDS (e.g., Exadata), or any other media. In addition, common data files 144 that are accessed by foreground sessions 112 and parallel query slave operations 120, may be accessible for a plurality of database processes whether inside or outside PDB sandboxes 110.

In one exemplary implementation, to dynamically regulate isolation and security PDB sandboxes 110 are configured to regulate resource isolation (e.g., isolation of files, processes, signals, etc.) such that tenant access between tenants or processes in one PDB sandbox 110 are isolated with respect to other PDB sandboxes 110. Moreover, processes running inside a particular PDB sandbox 110 may be isolated from processes occurring outside the particular PDB sandbox 110. For process isolation, database processes and non-database processes may be distinguished. For example, database processes often require additional privileges, while non-database processes inside a PDB sandbox 110 (e.g., spawned from a login shell, or from a sandboxed database process) may be further isolated. As such, PDB sandboxes 110 dynamically regulate a tenant's access to files, processes, and memory of another PDB sandbox 110 from within the tenant's shell, while allowing tenants to connect to PDBs that reside within their own PDB sandbox 110.

In addition, PDB sandboxes 110 may be configured to regulate resource isolation in clustered environments having a plurality of cluster nodes. For example, when a PDB is opened in a host, the associated PDB sandbox 110 may be started or activated on that host, and deactivated when the last PDB associated with the associated PDB sandbox 110 is closed on the host.

As discussed herein, PDB sandbox 110 may utilize such permission matrices, access process, state machines, data hierarchies, and the like to generate process isolation through a plurality of mechanism. In addition, tenant isolation may be configured to be absolute, permeable, or semi-permeable. For example, PDB sandboxes 110 may employ other mechanisms such as voluntary sharing to allow users opt in access. For example, if a user in a PDB sandbox 110 decides to share information with another PDB sandbox 110 (e.g. through a common temp file system, a socket it creates, etc.), PDB sandbox 110 may be configured to allow this type of voluntary sharing.

To effectuate communication within multitenant system 100, client processes and database instances communicate through a connection established, for example, using available Inter Process Communication (IPC) mechanisms or network software. A specific connection of a user to a PDB instance through a client process is considered a session. For example, for a database instance using SQL*Plus, a user establishes a session by providing a user name and password. A session typically lasts from the time the user connects until the time the user disconnects or exits the database application. To further effectuate communication, a plurality of database processes such as foreground processes 112, background processes 116, and other processes 134 are attached to a common SGA and communicate through semaphores, event ports, shared memory, and the like.

As described further herein, encapsulating PDBs forms isolation boundary layer 118, representing a fixed or semi-permeable boundary for dynamically regulating resources and communication to and from a respective PDB sandbox 110. PDB sandboxes 110 may be configured to regulate and control access of processes such as foreground processes 112 (e.g. foreground processes for local-user PDB sessions or parallel query slaves), background processes 116, database processes, non-database processes, and other processes 134, e.g., OS access, into and out of PDB sandboxes 110 through isolation boundary layer 118. For example, with regard to PDB sandbox 110A, the access of foreground processes 112A, parallel query slave processes 120A, and other processes 134A, e.g. shell logins through SSH daemon130, and any other process forked therefrom, into and out of PDB sandbox 110A is dynamically controlled by isolation boundary layer 118A. Similarly, with regard to PDB sandbox 110B, access of foreground processes 112B, parallel processes 120B, and other processes 134B into and out of PDB sandbox 110B is dynamically controlled by isolation boundary layer 118B.

In an implementation, PDB sandboxes 110 are configured to provide SSH daemons 130 access through isolation boundary layers 118 to allow administrators to utilize scripts, daemons, tools, debug processes, view trace files, etc. For example, PDB sandboxes 110A and 110B may be configured to provide SSH daemon 130 access through respective isolation boundary layers 118A and 118B via signals 132. While isolation boundary layers 118 may regulate processes inside an associated PDB sandbox 110 to prevent, for example, such internal process from sending signals or communication to processes in another PDB sandbox 110, or outside its associated PDB sandbox 110, exemplary implementations herein may provide database sessions outside of PDB sandboxes 110 access to a plurality of resources, including a plurality of PDB sandboxes 110.

PDB sandboxes 110 may also be configured to allow users access into PDB sandbox 110 through isolation boundary layers 118 to database processes running inside a PDB sandbox 110, upload staging data for external tables, regulate database processes and non-database processes inside PDB sandbox 110 to attach to or debug a process outside of its PDB sandbox 110 (for example, regulating attaching debuggers, tracing a process, dumping its call stack, etc.). Moreover, while PDB sandboxes 110 may be configured to regulate communication by regulating explicitly labeled shared memory, interprocess communication (IPC) messages, semaphores, event ports, and the like, through respective isolation boundary layers 118, PDB sandboxes 110 may be configured to regulate voluntary communication, for example, via unlabeled IPC conduits extending through isolation boundary layer 118.

In addition, PDB sandboxes 110 may be configured to regulate changes made by internal process 134 associated with PDB sandboxes 110 to prevent such internal process 134 that may have effects on multitenant system 100 from being modified. For example, PDB sandboxes 110 may be configured to prevent internal process 134 from making changes to processes such as scheduling classes, priorities, or nice values, binding of processes, and the like, by preventing such changes from crossing isolation boundary layers 118. In addition, PDB sandboxes 110 may be configured to regulate multi-threaded processes from entering or leaving PDB sandboxes 110. For example, PDB sandboxes 110 may regulate the ability for process threads to cross isolation boundary layers 118.

In some implementations, to further enhance isolation and security between tenants, PDB sandboxes 110 may be configured such that private data files 140, common data files 144, and the like, that are typically only accessed by background processes 116, (e.g., REDO logs) may be prevented from accessing processes within PDB sandboxes 110. However, PDB sandboxes 110 may be configured such that PDB private data files 142 and the like, disposed within PDB sandboxes may be accessed from processes 134 within and outside PDB sandboxes 110.

In some implementations, network PDB sandboxes 110 are configured such that client traffic to and from PDB sandboxes 110 through isolation boundary layers 118 uses isolated channels so that processes in one sandbox may not snoop (e.g., see) or otherwise access network packets to or from another sandbox. For example, PDB sandbox 110 may be configured such that isolation boundary layers 118 prevent snooping or other access of network packets over common interfaces (e.g. cluster interconnect, storage interfaces (RDS/IB, SCSI/FC, NFS/IP), or any other common data channel used for disaster recovery (e.g. Data Guard, GoldenGate), backup and restore, etc.

In some implementations, PDB sandboxes 110 may be hierarchical, that is a particular PDB sandbox 110 may have a parent PDB sandbox 110. For example, a hierarchy of two levels may be used: At the top-level, a particular PDB sandbox 110 without any parent may be created for each CDB ("CDB-level sandbox"). Below each CDB-level sandbox 110, leaf-level PDB sandboxes 110 are created for tenants ("tenant-level sandbox"), which are referred to as "sandboxes" (that is, the entity that is hosting PDB tenants). In this scenario, the term "sandbox" generally refers to a tenant's PDB sandbox 110 (leaf level), while the term "CDB-level sandbox" is used for the top-level PDB sandboxes 110.

FIGS. 2 and 3 illustrate dynamic access processes in the form of permission matrices 200 and 300 configured as a to provide permissions for dynamically regulating process routing, access, signaling, debugging, etc. to objects within and external to PDB sandboxes 110. While matrices 200 and 300 are described herein in terms of tables, matrices 200 and 300 may be generated, defined, or replaced by a plurality of different data structures and algorithms such as state machines, access processes, scripts, data hierarchies, and the like. For example, various access process, state machines, and protocols may be used in addition to or in lieu of matrices 200 and 300 to regulate process routing, access, signaling, debugging, etc. to objects within and external to PDB sandboxes 110.

Illustratively, matrices 200 and 300 may be configured to provide permission gates in order to regulate access to processes, files, resources, and the like, external and internal to PDB sandboxes through isolation boundary layers 118. For example, matrices 200 and 300 provide mechanisms to regulate whether processes instantiated within or external to PDB sandboxes 110 may or may not query other processes, send or not send signals, debug or not debug, communicate or not communicate, create or delete, access or not access, and the like, other processes and files disposed inside or outside PDB sandboxes 110.

In one implementation, matrix 200 may be defined by a matrix of permissions providing access instructions for processes, resources, and the like associated with PDB sandboxes 110 where processes having a "$PQ_X$" and "$JQ_X$" process designation represent processes located inside PDB sandboxes 110, while processes having a "PQ" and "JQ" process designation, represent processes located outside PDB sandboxes 110.

As discussed herein, matrix 200 may be used in conjunction with PDB sandboxes 110 to dynamically regulate the flow and direction of communication, read/write access, debugging, and the like, into and out of PDB sandboxes 110. For example, permission matrix 200 may be used by multitenant system 100 to allow one-way access, two-way access, or no access for processes, communication, file access, queries, and the like into or from PDB sandboxes 110 through respective isolation boundary layers 118.

Matrix 200 may be defined by a table of permissions having rows and columns, where column 210 and header row 212 identifying processes that are located inside or outside PDB sandboxes 110. In addition, matrix 200 may further include column 214 representing where resource consumption for processes listed in column 210 may be allocated. For example, cell 214B indicates that a parallel query slave operations 120 or job queue processes 124 has entered PDB sandbox 110A and therefore has their resource consumption accounted for in PDB sandbox 110A.

In exemplary implementations, column 210 represents a Y-axis listing processes such as such as foreground processes 112, background process processes 116, parallel query slave operations 120, job queue processes 124, SSH daemon 130, other processes 134, and the like, as actors. Row 212 represents an X axis listing objects, such as foreground processes 112, background process processes 116, parallel query slave operations 120, job queue processes 124, SSH 130, other processes 134, and the like on which the actors listed in column 210 perform operations thereon. The operations permitted by the actors on the objects are shown in cells formed by the intersection of columns and rows of permission matrix 200.

TABLE 1

| Permission | Description |
| --- | --- |
| see | See another process in the /proc file system (e.g. through "ps") |
| signal | Send a signal to another process |
| debug | Debug another process, e.g. by attaching a debugger or examining its stack |
| IPC | Communicate with another process through SHM, semaphores, or event ports |
| enter | Allows a process (or its child processes) to enter a sandbox |
| leave | Allows a process to leave its sandbox |
| admin | Allows a process to administrate sandboxes (e.g. create/configure sandboxes) |
| create | Allows a process to create a file |
| delete | Allows a process to create delete file |
| access | Allows a process to access a file (read/write) |

LEGEND 1

| Label | Description |
| --- | --- |
| green | Generally allowed |
| Red (Red/strikeout) | Generally not allowed |
| black | Depending on regular permissions (user ids, file access permissions, etc.) |

Referring to FIGS. 1-3, table 1, and legend 1, matrix 200 includes one or more rows 216, 218, 220, 222, 224, 228, 230, and 232. Each row includes cells containing permissions, such as "see", "signal", "debug," IPC," and the like, for processes and objects located inside and outside PDB sandboxes 110. Illustratively, in accordance with legend 1, each cell of matrix 200 represents different permission conditions relative to actors listed in column 210 and objects listed in header row 212. Legend 1 represents only one example of a plurality of different permission schemes that may be used to advantage.

For example, to illustrate the operation of matrix 200, with regard to row 216, cell 216A represent conditions where actors listed in column 210 of foreground processes 112, background processes 116, parallel query slave operations 120, and job queue processes 124, situated outside PDB 110A, are allowed to see, signal, debug, and communicate with objects listed in row 212, which correspond to cell 216A, of foreground processes 112, background processes 116, parallel query slave operations 120, and job queue processes 124, that are also situated outside PDB sandboxes 110; cell 216F represents a condition where the actors of foreground processes 112, background processes 116, parallel query slave operations 120, and job queue processes 124 are allowed to see, but may or may not be allowed to debug, signal, and communicate with the objects listed in row 212, which correspond to cell 216F, of process 134 and SSH 130 in column 212, which are also situated outside PDB sandboxes 110, depending on tenant access permissions such as user ids, file access permissions, etc.; and cell 216I represents a condition where the actors of foreground processes 112, background processes 116, parallel query slave operations 120, and job queue processes 124 are allowed to enter, leave, and can administer PDB sandbox 110A.

In another example, with regard to row 218, cell 218A represents a condition where the actors listed in column 210 of parallel query slave operations 120A and job queue processes 124A, situated inside PDB sandbox 110A, may or may not see, depending on tenant access permissions such as user ids, are allowed to signal and communicate with, but are not allowed to debug the objects listed in column 212 of foreground processes 112, background processes 116, parallel query slave operations 120, and job queue processes 124, situated outside PDB sandbox 110A; cell 218F represents a condition where actors of parallel query slave operations 120A and job queue processes 124A, are not allowed to see, debug, signal, and communicate with the objects listed in column 214 of other processes 134 and SSH 130, also situated outside PDB sandboxes 110; and cell 218I represents a condition where the actors of parallel query slave operations 120A and job queue processes 124A are not allowed to enter or leave PDB sandbox 110A, but are allowed to administer PDB sandbox 110A.

In a further example, with regard to row 230, cell 230A represents a condition where processes 134A situated inside PDB sandbox 110A, are not allowed to see, signal, debug, or communicate with the objects listed in header row 212, which correspond to cell 230A, of foreground processes 112, background processes 116, parallel query slave operations 120, and job queue processes 124, situated outside PDB sandbox 110A; cell 230G represents a condition where process 134A is allowed to see, but may or may not be allowed to debug, signal, and communicate with objects listed in row 212, which correspond to cell 230G, of processes 134A situated inside PDB sandbox 110A depending on tenant access permissions such as user ids; and cell 218I represents a condition where process 134A is allowed to enter, but is not allowed to leave or administer PDB sandbox 110A.

Similarly to matrix 200, matrix 300 includes one or more rows 316, 318, 320, 322, 324, 328, 330, and 332. Each row includes cells representing permissions, such as "create", "access", and "delete," and the like, for files and objects located inside and outside PDB sandboxes 110. Illustratively, in accordance with legend 1, each cell of matrix 300 represents different permission conditions relative to actors listed in column 310 and objects listed in header row 312.

For example, to illustrate the operation of matrix 300, with regard to row 316, cell 316A represents a condition where actors listed in column 210 of foreground processes 112, background processes 116, parallel query slave operations 120, and job queue processes 124, situated outside PCB 110A, are allowed to create, access, and delete objects listed in row 312, which correspond to cell 316A, of data files 140 that are also situated outside PDB sandboxes 110; cell 316F represents a condition where the actors of foreground processes 112, background processes 116, parallel query slave operations 120, and job queue processes 124 are allowed to create, access, and delete objects listed in row 312, which correspond to cell 316F, of PDB-private data files 152A, which are situated inside PDB sandbox 110A; and cell 316H represents a condition where, depending on tenant access permissions such as user ids, file access permissions, etc., the actors of foreground processes 112, background processes 116, parallel query slave operations 120, and job queue processes 124 may or may not create, access, and delete objects listed in row 312, which correspond to cell 316H, of common system files 154, that are situated outside PDB sandbox 110A depending on tenant access permissions such as user ids.

In another example, with regard to row 318, cell 318A represents a condition where the actors listed in column 310 of parallel query slave operations 120A and job queue processes 124A, situated inside PDB sandbox 110A, are not allowed to create, delete, or access objects listed in column 312, which correspond to cell 318A, of CBD-private data files 140, that are situated outside PDB sandbox 110A; cell 318F represents a condition where, depending on tenant access permissions such as user ids, file access permissions, etc., actors of parallel query slave operations 120A and job queue processes 124A, situated inside PDB sandbox 110A, are allowed to create, delete, or access objects listed in row 312, which correspond to cell 318F, of system files 142A, also situated inside PDB sandbox 110A; and cell 318H represents a condition where the actors of parallel query slave operations 120A and job queue processes 124A may or may not be allowed to create, delete, and access objects listed in row 312, which correspond to cell 318H, of common system file 154, situated outside PDB sandbox 110A, depending on tenant access permissions such as user ids.

In a further example, with regard to row 330, cell 330A represents a condition where actors listed in column 310 of processes 134A situated inside PDB sandbox 110A, are not allowed to create, delete, or access, database objects listed in row 312, which correspond to cell 330A, of data base objects 140A, situated outside PDB sandbox 110A; and cell 330F represents a condition where actors listed in column 310 of processes 134A are not allowed to create, delete, or access objects listed in row 312, which correspond to cell 330F, of file system files 142A.

Figure 4:
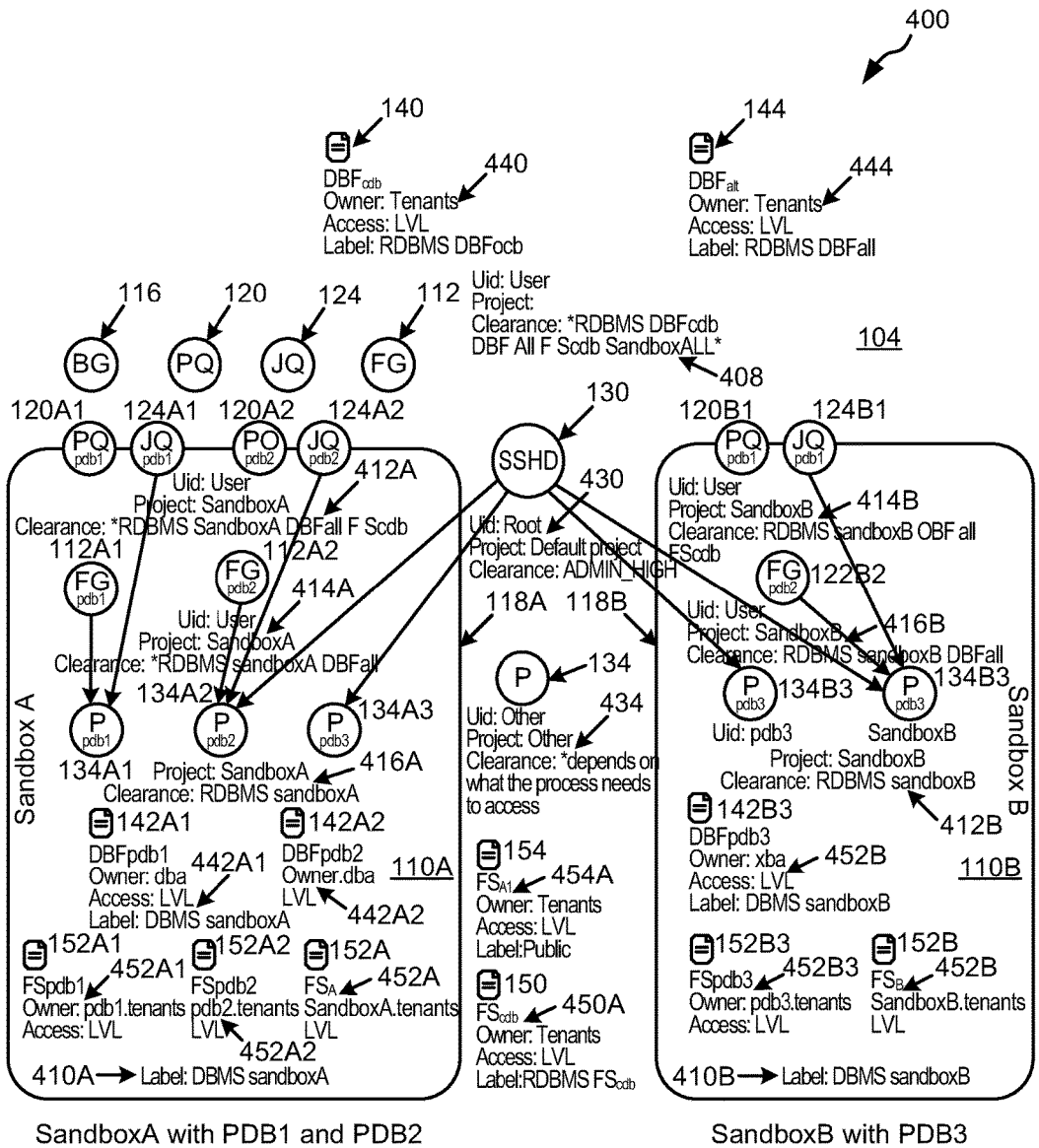
FIG. 4 is a high level illustration of a PDB sandbox implementation.

FIG. 4 is a high level illustration of PDB sandbox 110 sandbox schema 400 for use with multitenant system 100. Sandbox schema 400 represents a dynamic access process utilizing labeling of users, groups, roles, profiles, authorizations, privileges, classifications, and clearances. With regard to labeling schema 400, sandboxing generally utilizes label configuration files, which define classifications, labels, and compartments of PDB sandboxes 110. Labels may also be used to establish RDBMS administration and clearances for processes and files residing inside and outside PDB sandboxes 110. Multitenant system 100 may employ schema 400 in lieu of, or in conjunction with, permission matrices 200 and 300 described herein to effectuate the regulation and isolation of tenants using PDB sandboxes 110.

Users may be identified by a unique user name, which maps to unique user ids (uids), which may be authenticated, for example, using passwords. A user may login to a host (e.g. through SSHD 130) by providing a user name and password, and is provided a home directory in which the user has read and write access. Each user may be associated with a certain set of user attributes, such as privileges, authorizations, profiles, or clearances. Users may belong to one or multiple groups. Groups may be identified by a unique group name, which may map to a unique group identification, and may or may not be hierarchical. Roles may be defined by sets of profiles, which may be assigned to users or groups. Profiles may be sets of authorizations and privileged commands that may assigned to a user or a role.

In exemplary implementations, one or more processes may have a plurality of different user ids that are used to determine the privilege levels of tenants. For example, there may be three uids: "effective uid," "real uid," and "saved uid." The real uid (mid) may be used to identify the user who has originally forked the process and is typically not changed unless the effective uid is "0" (root) or the process has process privilege. The effective uid (euid) may be used to determine the current set of privileges of the process which the kernel may check against. If the saved uid (suid) is 0 or the process has proc_setid privilege, it may change its user ids to any other user id. An extended privilege (e.g. "{proc_setid}:80-100") may constrain the change of user ids to a single uid or a range of uids. A call may be used for the three uids (euid, ruid, suid) of a process, some calls only change the effective uid, and other calls change real and effective uid.

In an implementation, schema 400 utilizes labeling of files, processes, and other resources to enforce security boundaries for use with PDB sandboxes 110. In exemplary implementations, the kernel validates the clearance of a process against the label of an object (such as a file, shared memory segment, or other process) and prevents access and/or hides the object from the process or enforces other security controls if the object's clearance is not sufficient.

Labels may be considered attributes that may be used for policy decisions. In some implementations, for example, labels consist of a classification and/or multiple compartments. Each classification generally corresponds to a unique integer and optional compartment bits. A compartment corresponds to one or more bits out of a plurality of (e.g., 256) available compartment bits. Bits may define any number of relationships such as hierarchical relationships, disjoint relationships, overlapping relationships, etc.

Labels may be configured to provide a dedicated classification, which is generally used for each CDB 104 in order to support multiple CDBs 104 on the same host and isolate the CDBs 104 from each other. A classification may be used to dominate a plurality of CDBs 104. Separate compartments may be defined for each sandbox (e.g. "sandbox 1", "sandbox 2", etc.), such that compartments are typically disjoint. Additionally, a compartment (e.g. "sandboxALL") with a plurality of sandbox compartments as subcompartments (e.g., "sandbox 1 . . . sandboxN") may be defined.

A plurality of further compartments may be defined to label shared database files (e.g., UNDO, TEMP, tablespaces) accessed by a plurality of PDBs, CDB-private database files (e.g., REDO logs) that are usually never accessed by PDBs, and CDB-private directories for files like CDB-level configuration and trace files inaccessible to PDBs. Compartment names may be shared among classifications and therefore among a plurality of CDBs. However, since a label usually consists of the classification and compartments, a label typically unique for each CDB 104 and PBD sandbox 110.

A label may dominate another label if its classification is at least equal to the other's classification and its compartment bits include a plurality of the bits of the other label. Each label therefore may be configured to also dominate itself. Labels may be applied to objects such as files and subjects such as users and processes.

Clearances may be employed to form an isolation boundary level 118, for example, using label access for users and processes. In some implementations, a user or process may access objects (e.g. files) if the user or process clearances dominates the object's label, which means that the user or process clearances have a higher or equal classification and contains a plurality of compartment bits of the object. Similarly, processes may lower their clearance by dropping compartment bits or lowering their classification. Clearances may be configured as an adjunct to other policy decisions and generally do not replace other policy decisions, but may provide an additional policy. For example, a process or user with sufficient clearance may still pass a plurality of other policies (e.g. file access permissions, matching user or group ids, privileges) to access an object like a file, or see or debug another process internal or external to PDB sandboxes 110.

Role-Based Access Control (RBAC) may be used to allow users to configure attributes for the execution of certain commands when invoked from certain users or roles. This implementation allows the modification of user ids, privileges, and clearances of a new process executed from a configured binary by users.

Projects allow for identification and administrate resource controls for related work or workloads. A task is a group of processes belonging to a project. Each successful login to a host creates a new task, which may be automatically assigned task identification. In some implementations, users are provided a default project, which may be specified, for example, in a configuration file, in an LDAP, NIS project database. Resource controls configured through projects may be applied on a project level, task level, or process level, and apply to a plurality of processes of the project, task, or just the process itself. Resource controls set through projects (and task ids, etc.) are inherited across process creation.

In an implementation, PDB sandbox 110 consists of PDBs, unique names, labels, projects, users, and file systems. For example, as illustrated in FIG. 4, each PDB sandbox 110A and PDB 110B include three encapsulated PDBS: PDB1, PDB2, and PDB3, residing on a common CDB 104. PDB sandbox 110A includes label 410A of "DBMS sandbox A" defining PDB sandbox 110A. Similarly, PDB sandbox 110B includes a label 410B of "DBMS sandbox B" defining PDB sandbox 110B. CDB-private database files 140 residing outside PDB sandboxes 110, are labeled with a label 440, e.g., "Label: RDBMS DBF$_{CDB}$," including information such as the owner of the files, e.g., "Owner:Tenants," access levels, e.g., "Access:LVL," and the like. Common private database files 144 residing outside PDB sandboxes 110 are labeled with label 444, e.g., "Label: RDBMS DBF$_{CDB}$," which includes information pertaining to, for example, owner of the files, e.g., "Owner:Tenants," access levels, e.g., "Access:lvl," and the like.

Similarly, SSH daemons 130, processes 134, file systems 154, and the like residing outside PDB sandboxes 110 may be labeled with labels that include information pertaining data such as user identification, project name, clearances, access levels, and the like. For example, SSH daemon 130 includes a label 434, which provides information pertaining to, for example, user identification, e.g., "Uid:root," stipulating which files have access, project association, e.g., "Project: Default project owner of the files, e.g., "Owner: Tenants," access levels, e.g., "Access:lvl," and the like. Processes 134 includes a label 434 which includes information such as user identification, e.g., "Uid:Other," project, e.g., "Project:other," and clearance information, e.g., "Clearance: *depends on what the process needs to access." Further, foreground processes 112, background process processes 116, parallel query slave operations 120, job queue processes 124, and the like, may be labeled using label 408 providing, for example, a user identification "UID:User," a project label, and clearance level, e.g., "RDBMS DBFcdb DBFALL FScbd SanboxAll," which allows such processes and operations to interact with CDB-private data files 140, common files 144, and PDB sandboxes 110.

In an implementation, a dynamic access process may include labels employed to regulate process access to processes and files situated inside and outside PDB sandboxes 110, and the ability to enter and leave PDB sandboxes 110 through isolation boundary layers 118. Illustratively, parallel query slave operations 120A1 and job queue processes 124A1, associated with a first PDB (PDB1), and parallel query slave operations 120A2 and job queue processes 124A2, associated with PDB2, are labeled with label 414A with information such as user identification, e.g., "Uid:User," project, e.g., "Poject:SandboxA," and clearance, e.g., "Clearance:*RDBMS Sanbox DBFall $FS_{cdb}$," to allow migration to and from PDB sandbox 110A. Similarly, foreground processes 112A1, associated with PDB1, and foreground process 112A2, associated with PDB2 are labeled with label 416A with information such as user identification, e.g., "Uid:User," project, e.g., "Poject:SandboxA," and character, e.g., "Character:*RDBMS SandboxA DBFall" to allow migration to and from PDB sandbox 110A.

Analogously, within PDB sandbox 110A, process 134A1, process 134A2, and 134A3, associated with PDB1, PDB2, and PDB3, respectively, are provided label 416A, PDB-private data files 142A1 and PDB-private data files 142A2, associated with PDB1 and PDB2 respectively, are provided labels 442A1 and 442A2, respectively; and CDB-private system files 152A1 and 152A2, associated with PDB1 and PDB2, respectively, and PDB-private system files 152A, are all provided with respective labels 452A1, 452A2, and 452A, providing information pertaining to ownership and access levels within PDB sandbox 110A.

Similarly, referring to PDB sandbox 110B having three PDBs: PDB1, PDB2, and PDB3, parallel query slave operations 120B1 and job queue processes 124B1, associated with PDB1, foreground process 112B2, associated with PDB2, processes 134B3, associated with PDB3, are provided respective labels of 414B, 416B, 412B which provide data and information such as user identification, projects, clearance levels, and the like, to allow the regulation and control of such processes within and external to PDB sandbox 110B.

Analogously, referring to PDB sandbox 110B, PDB-private data files 142B3 associated with PDB3 are provided label 452B3; and CDB-private system files 152B3, associated with PDB3, and PDB-private system files 152B, are all provided with respective labels 452B3 and 452B, providing information pertaining to ownership and access levels for such files within PDB sandbox 110B.

Figure 5:
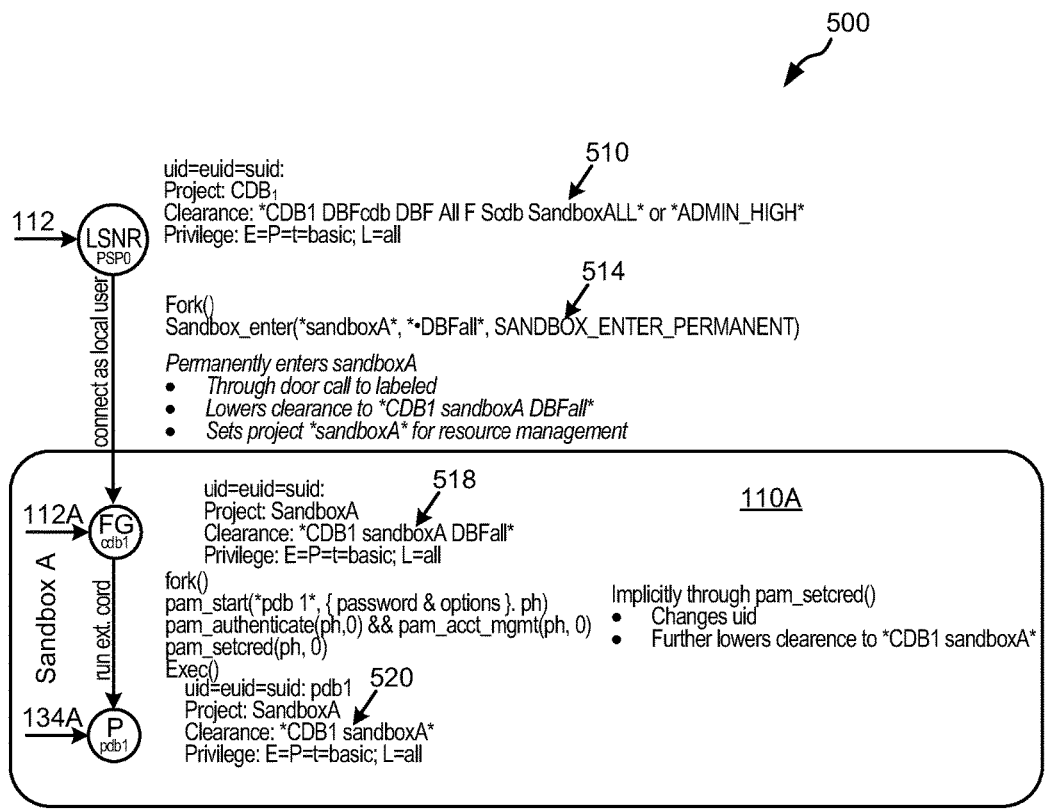
FIG. 5 is a high-level illustration of foreground processes transitioning from outside to inside a PDB sandbox.

FIG. 5 is a high-level illustration 500 of foreground process 112 created, for example by a listener (LSNR) or CMON process created outside PDB 110A, transitioning from outside PDB sandbox 110A into PDB sandbox 110A. As described herein, the transition into PDB sandbox 110A may be accomplished in this implementation by lowering privileges and/or by selectively varying clearances, classifications, and the like.

Privileges typically allow users to specify a set of permissions on a per-process basis. For example, consider a process having four privilege sets: the "effective set (E)," "permitted set (P)," "inheritable set (I)," and "limit set (L)." In this scenario, the effective privilege set determines the privileges the kernel may check against at each point in time. A process may add or remove privileges from its effective set if those are contained in the permitted set. When a process calls, it may pass-on the privileges defined in the inheritable set. The limit set is typically the upper bound of privileges a process may obtain.

File access permissions allow the selection of which users are able to read, write, or execute a file or directory. Files and directories may have user and group ids, typically those of the user and group who created them. In exemplary implementations, UNIX file permissions allow a user to specify file accesses read (r), write (w), and execute (x) permissions for the file owner (u), users of the group (g), and other users (o). A file system maybe configured to support Access Control Lists (ACLs) for files which allow to specify more fine-grained access control, and are also translated using translation protocols. ACLs enable users to distinguish users, groups, and others, and to specify any number of individual users or groups, and give each of them fine-grained privileges. They also allow to specify inheritance, e.g. from the directory level.

In one example as illustrated in FIG. 5, to enter PDB sandbox 110A, foreground process 112 joins project "sandbox A," by invoking, for example, a sandbox entry API 514 (i.e., sandbox_enter) with flag, e.g., SANDBOX_ENTER_PERMANENT. By joining project "sandbox A," foreground process 112 lowers the clearance for the label 510 "CDB1 sandbox A," and becomes foreground process 110A (FGcdb) situated inside PDB sandbox 110A. Since foreground process 112A maintains its user id, foreground process 112A is allowed to signal other processes 134 inside and outside PDB sandbox 110A. However, in this scenario the clearance level attained only allows foreground process 110A the ability to see or debug processes 134A inside PDB sandbox 110A. Moreover, the clearance level may be used to restrict foreground process 112A access to data files and other files (e.g. trace files) that belong to foreground process 112A, as well as common data files.

Figure 6:
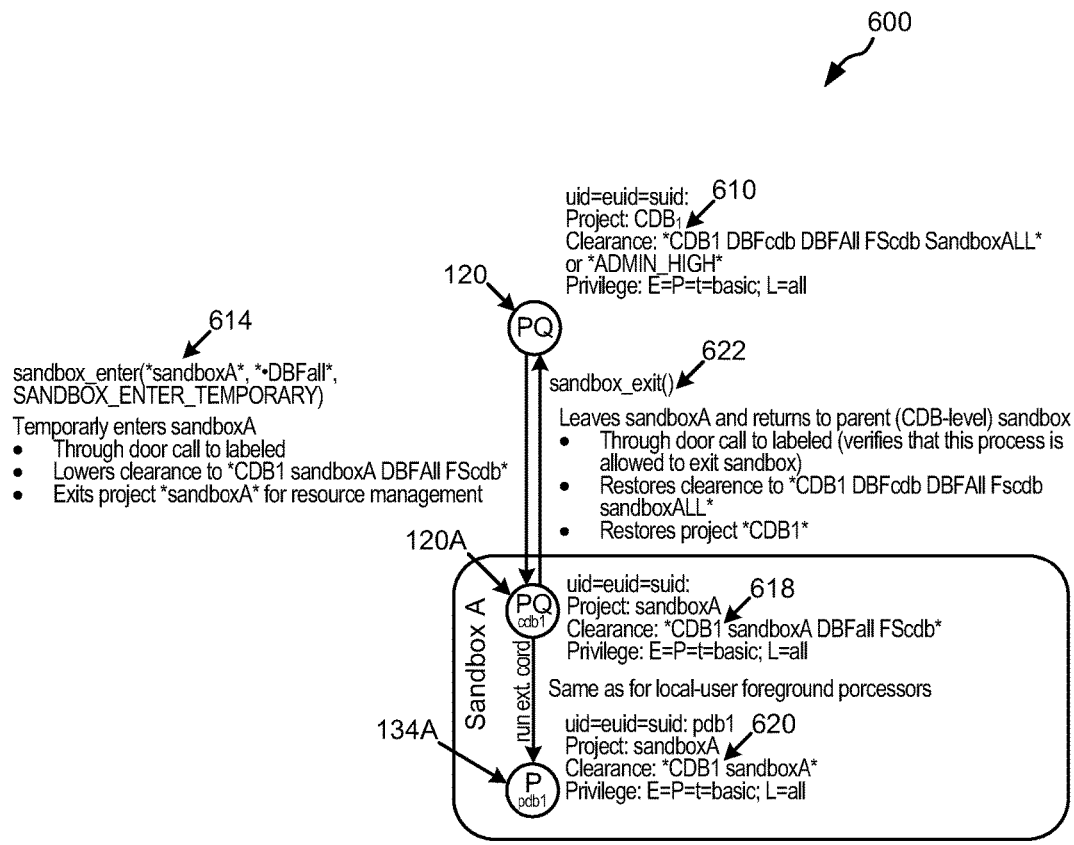
FIG. 6 is a high level illustration of parallel query slave operation transitioning into and from a PDB sandbox.

Similarly, FIG. 6 is a high level illustration 600 of parallel query slave operation 120 created outside PDB 110A, which employs clearance protocols to enter PDB sandbox 110A. Parallel query slave operations 120, job queue processes 124, and other processes 134 often switch in and out of PDB sandboxes 110 multiple times throughout their process lifetime, and leave PDB sandboxes 110 when the processes are finished.

In this example, in order to enter PDB sandbox 110A, parallel query slave operation 120 associated with label 610, invokes sandbox temporary entry API 614 with flag of "SANDBOX_ENTER_TEMPORARY." Parallel query slave operation 120 lowers its clearance associated with label 610 to "CDB1 sandboxA DBFall FScdb," to join project "sandboxA" associated with PDB sandbox 110A. In some implementations, in order to maintain certain compartment bits on top of the sandboxA label, when calling API 614 the "+DBFall" compartment modifier may be specified in label 618 to enable processes the ability to access common CDB-level data files 144, such as sysaux or undo tablespaces. In some implementations, compartments such as the "+FScdb" compartment may be employed to access CDB-level files 140, such as trace files.

Once parallel query slave operation 120A has completed its work and, for example, switches back to a root container, parallel query slave operation 120A may invoke an exit process, such as sandbox exit API 622 (i.e., sandbox_exit( )). Exit API 622 may be configured to make a call to, for example, a label daemon, to check whether parallel query slave operation 120A is allowed to leave the PDB sandbox 110A, and if parallel query slave operation 120A is allowed to leave PDB sandbox 110A, sandbox exit API 622 raises the parallel query slave operation 120A clearance and restores the parallel query slave operation 120A project, for example, to an initial clearance status, e.g., clearance protocols provided by label 610.

Figure 7:
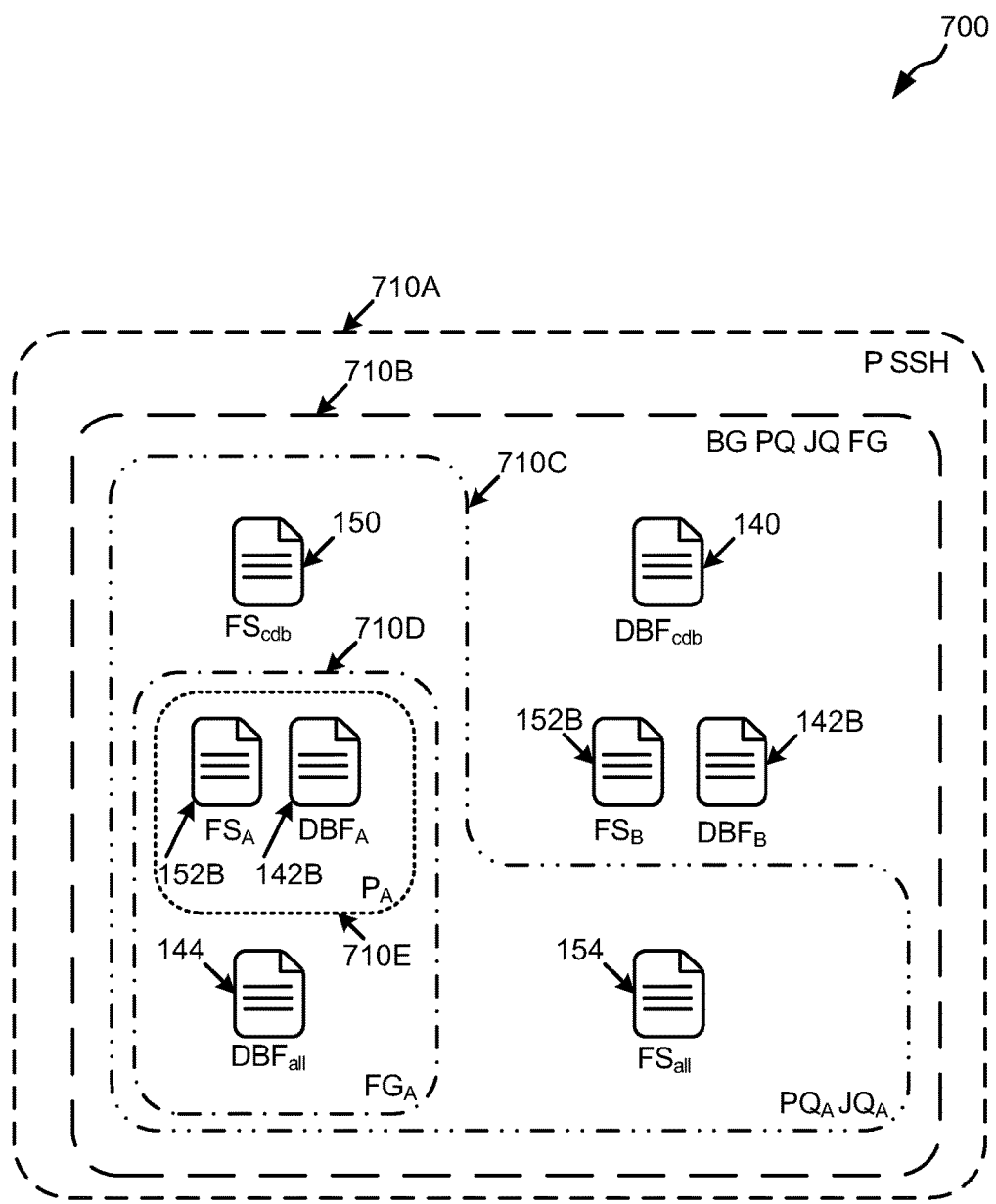
FIG. 7 is a high level illustration of file access permission boundaries.

FIG. 7 illustrates file access permissions schema 700 based on process type with memory boundaries 710. In an implementation, memory boundaries 710 include memory boundaries 710A-E configured to regulate access to processes associated with CDB-private data files 140, PDB-private data files 142, common data files 144, CDB-private system files 150, PDB-private system files 152, and common system files 154 disposed within memory boundaries 710A-E.

Figure 8:
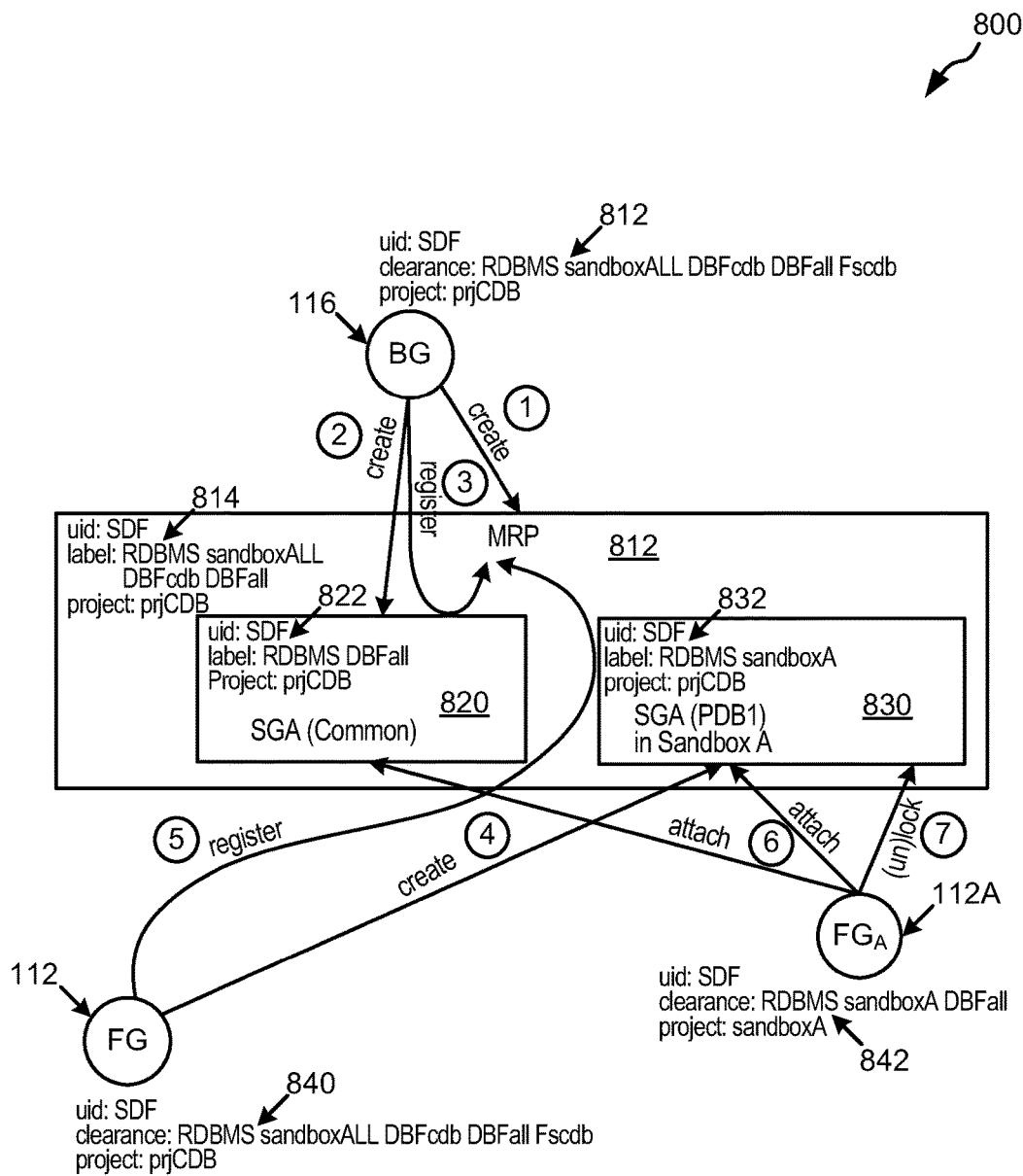
FIG. 8 is a high level illustration of a system global area model utilizing one or more optimized shared memory segments and clearances to regulate process access.

As illustrated, memory boundary 710A regulates memory access processes associated with other processes 134 and SSH 130 external to PDB sandboxes 110. Memory boundary 710B regulates memory access for processes associated with foreground process 112, background process 116, parallel query slave processes 120, job query processes 124. Memory boundary 710B regulates memory access processes associated with foreground process 112, background process 116, parallel query slave 120, job query processes 124, external to PDB sandboxes 110. Memory access boundary 710C regulates memory access processes associated with foreground process 112, background process 116, parallel query slave processes 120A, job query processes 124A, internal to PDB sandbox 110A. Memory boundary 710E regulates memory access processes associated with processes 134A internal to PDB sandbox 110A. For example, memory access boundary 710B may be configured to prevent processes associated with CDB-private data files 140 outside PDB sandboxes 110, and PDB-private data files 142B, file system files 152B inside PDB sandbox 110B, access to memory disposed within memory access boundary 710B FIG. 8 is a high level illustration of SGA model 800 representing a dynamic access process utilizing one or more OSM segments per PDB and clearances to regulate process access associated with PDB sandboxes 110. As illustrated, SGA model 800 includes a Memory Reservation Pool (MRP) 812 created at step one (1) by a background process 116, and labeled with label 814. At step two (2) a common SGA 820 is created for common or private use using one or more OSM segments. At step three (3), SGA 820 is registered with the MRP 812 and labeled with label 822. Label 822 establishes the clearance level for access to OSM segments to, for example, lock or unlock OSM segment granules. At step four (4), a process, such as foreground process 112 having label 832, opens a PDB sandbox 110 and creates a private SGA 830 having PDB-private OSM segments. In this illustration, label 832 sets the clearance level of foreground process 112, and label 832 sets the clearance level of private SGA 830. At step five (5), private SGA 830 is registered with MRP 812. At step six (6), tenants of PDB sandboxes 110 establishing connections to the tenant's associated PDBs, for example, by initiating foreground processes 112A having label 842. Label 842 may then be used to allow foreground processes 112A to attach to OSM segments associated with both common SGA 820 and private SGA 830, for example, by lowering clearances. At step 7, foreground processes 112A with the proper clearance levels are attached to common OSM segments associated with SGA 820 and private OSM segments associated with private SGA 830 allowing foreground process 110A may lock or unlock granules associated with the OSM segments.

In other implementations, a hierarchical clearance process utilizing dominant and subdominant label clearances may be used to, for example, allow processes, such as foreground processes 112, background process 112, and the like, to change or assign new MRP labels, check the clearance of a process P when registering an OSM segment, check the clearance of a process when attaching to an OSM segment or performing other operations on the OSM segment, and the like. For example, utilizing such a hierarchical clearance process, a process may be capable of assigning a new label or changing an existing MRP label provided that the process label's clearance level is dominant over the MRP's label 814, a process may only be allowed to label the OSM segment if it dominates the OSM segment's current label, etc.

Figure 9:
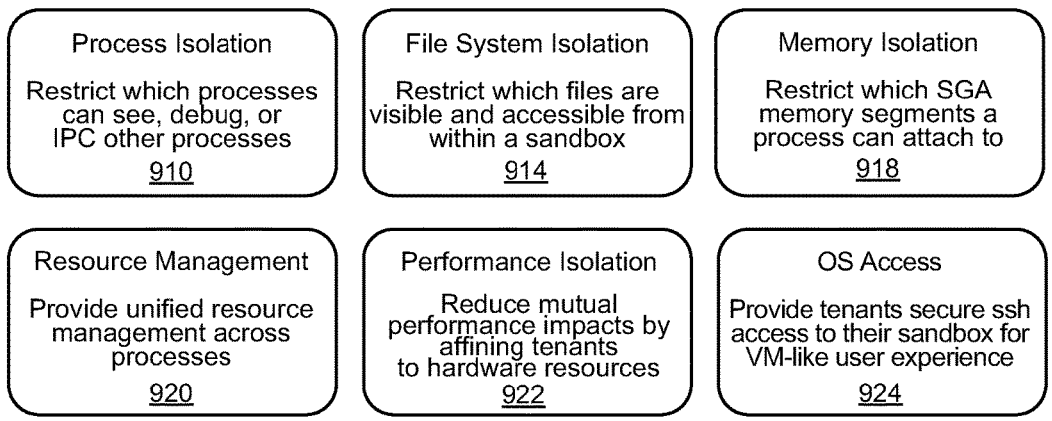
FIG. 9 is a high level illustration of a plurality of PDB sandboxing features.

FIG. 9 illustrates a summary 900 of some of the features of PDB sandboxing described herein to provide security and isolation between tenants of multitenant system 100. As described herein, resource isolation 910, system isolation 914, memory isolation 918, may be achieved with PDB sandboxes 110 utilizing one or more access matrices, access process, and labeling schemas described herein. Such access matrices, processes, and schemas may be used by the PDB sandboxes 110 to regulate the isolation of file systems with read/write access for private data, private memory, shared memory, SGA memory, network access, and the like, associated with PDB sandboxes 110.

PDB sandboxes 110 may also be configured to provide resource management 920, performance isolation 930, and secure SSH access 924, through regulating CPU and memory sharing, capacity thresholds (e.g. shares and caps for CPU and private and shared memory), file systems access (e.g. file system quotas and I/O shares or caps), network bandwidth control (e.g. bandwidth limits, and providing one or more OS users with SSH access to PDB sandbox 110. For example, for a plurality of external interfaces (e.g., SQL and SSH access), PDB sandboxes 110 may provide resource controls that detect and control TCP, SDP connections associated with PDB sandboxes 110 to regulate bandwidth consumption, regulate resource consumption in the operating system, enable system administrators to identify resource consumers in the OS, etc.

In an implementation, resource management may be implemented using projects and tasks, which provide resource controls, Fair Share Scheduling (FSS), IP Quality of Service (IPQoS), etc. For example, a Fair Share Scheduler (FSS) may be configured to allow users to configure the relative CPU consumption of processes belonging to different projects. The FSS starts to throttle processes that have consumed more than their share allowance once overall system-wide CPU is saturated (e.g., CPU utilization is near 100%). Shares may be combined with utilization thresholds to additionally restrict workloads on systems considered non-saturated.

IPQoS allows the prioritization and throttling of IP traffic. A traffic flow may be identified based on a tuple source address (e.g., 5-tuple), destination address, source port, destination port, and protocol number by inspecting the IP header of network packets. Additionally, applications may specify flows through a call on the socket, which allows, for example, the use of a PDB sandbox 110 name, PDB name, or service name to identify a network flow.

Further, resource pools may be configured to be persistent and named entities, which allow users to separate workloads by assigning them dedicated CPUs to reduce their interference. Resource pools are often based on processor sets and therefore may be exclusive and non-overlapping, which reduces or eliminates the possibility of over-subscription and makes proper dimensioning more calculable as enough unassigned CPUs are typically reserved for kernel threads and other unbound threads.

Figure 10:
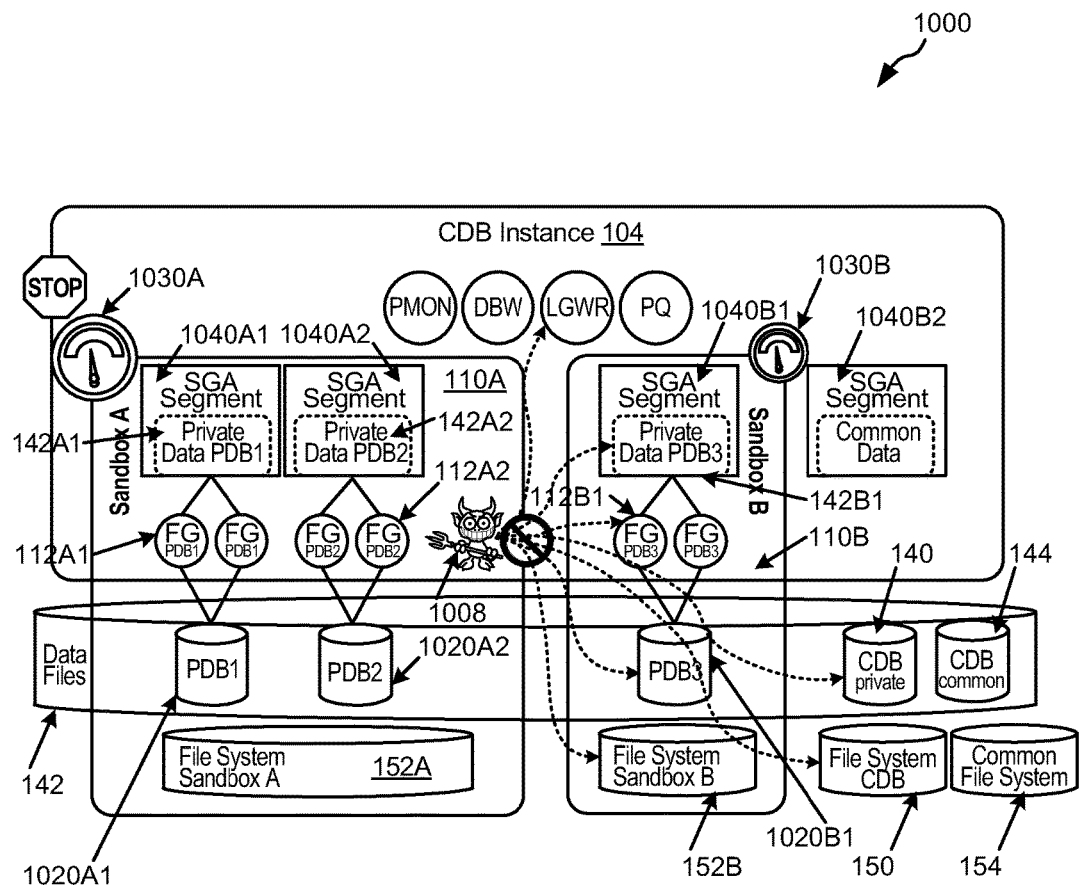
FIG. 10 is a high level illustration of PDB Sandboxing implementation.

FIG. 10 is a high level illustration of a PDB sandbox implementation 1000 for implementing dynamic access processes in conjunction with encapsulated PDBs to provide security and tenant isolation features as described herein. In an implementation, PDB sandbox implementation 1000 includes CDB 1110 configured to encapsulate PDB1 1020A1 and PDB2 1020A2, forming PDB sandbox 110A, and encapsulate PDB3 1020B 1 forming PDB sandbox 110B. As described herein, such PDB encapsulation combined with access matrices 200 and 300, access processes, and clearances through access labeling provides for a plurality of security and isolation features, including features described in FIG. 9, while preventing surreptitious activity 1008 outside, inside, and between PDB sandboxes 110.

In addition, PDB sandbox implementation 1000 includes gauge processes 1030 configured to show the measurement and enforcement of resource management, which is usually done inside the kernel. For example, with respect to FIG. 9 discussed above, gauge process 1030A may be used to indicate bandwidth consumption, resource consumption in the operating system, enable system administrators to identify resource consumers in the OS, etc., for PDB sandbox 110A. Similarly, gauge process 1030B may be used to indicate bandwidth consumption, resource consumption in the operating system, enable system administrators to identify resource consumers in the OS, etc., for PDB sandbox 110B.

In exemplary implementations, CDB 104 also includes SGA segments 1040 allocated for a particular PDB sandbox 110. For example, PDB sandbox 110A includes SGA segments 1040A1 and 1040A2, which include PDB private data files 142A1 and 142A2, respectively. As described above, foreground processes 112 residing inside PDB sandboxes 110 are provided access to private data files 142 and to the associated PDB. In this illustration, foreground processes 112A1 associated with PDB1 1020A1, are allowed to access private data files 142A1 located in SGA segment 1040A1. In addition, foreground processes 112A2 associated with PDB2 1020A2, are allowed to access private data files 142A2 located in SGA segment 1040A2. Similarly, foreground processes 112B1 associated with PDB3 1020B1, are allowed to access private data files 142B1 located in SGA segment 1040B1. Thus, such PDB sandbox implementation 1000 is configured to prevent surreptitious activity 1008 between PDB sandboxes 110A and 110B.

Figure 11:
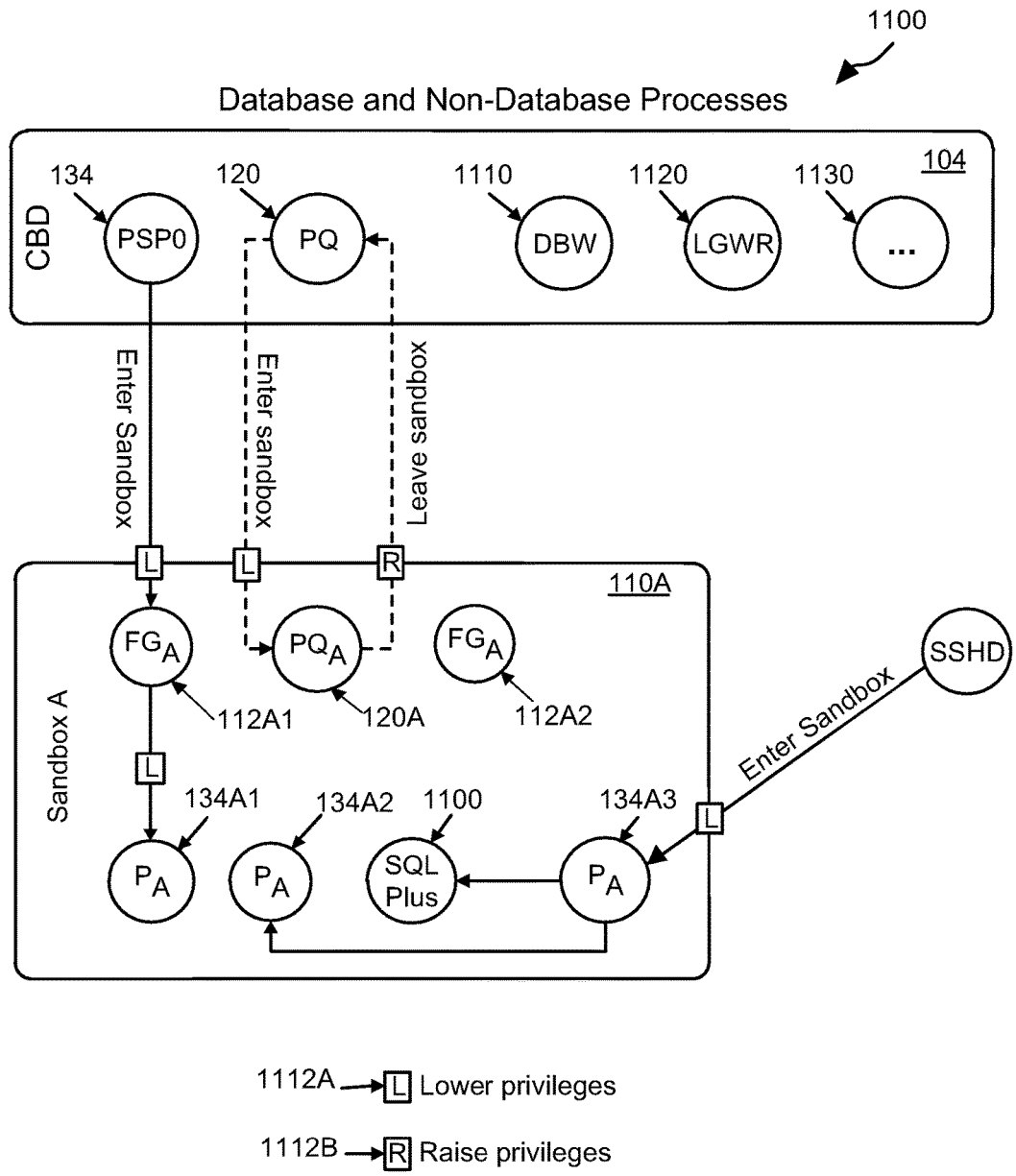
FIG. 11 is a high level illustration of PDB Sandboxing process for database and non-database processes.

FIG. 11 is a high level illustration of PDB Sandboxing process 1100 for database and non-database processes. In an implementation, a dynamic access process employs privileges which are regulated using privilege raising processes 1112A and privilege lowering process 1112B implemented, for example, through permissions, clearances, and the like, to regulate whether a process may enter or leave PDB sandboxes 110. For example, privilege raising process 1112A and privilege lowering process 1112B may be employed to allow processes external internal to PDB sandboxes 110 to enter and leave PDB sandboxes 110.

As illustrated in FIG. 11, process spawner 134 (PSP0) spawns processes such as foreground process 112A1 ($FG_A$) from outside PDB sandbox 110A. To isolate foreground process 112A1, and only allow foreground process 112A1 access to PDB sandbox 110A, privilege lowering process 1112A may then be employed to lower the privileges of foreground process 112A1, which thereby allows foreground process 112A1 to enter PDB sandbox 110A. However, in this illustration, once foreground process 112A1 privileges are lowered, foreground process 112A1 remains in PDB sandbox 110A.

When spawning other child processes from a database processes within a PDB sandbox 110, privilege lowering process 1112A may be invoked to lower privileges of such child processes to specified levels. For example, foreground process 112A1 within PDB sandbox 110A may use privilege lowering process 1112A to lower privileges of child process 134A1 to a specified level. However, lowering privileges of child process 134A1 prevents child process 134A1 from operating with other processes having a higher privilege level, such as foreground process 112A1 and parallel query slave process 120A having higher privileges, disposed within PDB sandbox 110A.

In another implementation, some processes, such as parallel query processes 120, may be configured to enter temporarily into PDB sandbox 110A. For example, privilege lowering process 1112A may be employed to lower the privileges of parallel query process 120 to enter PDB sandbox 110A thereby transforming parallel query processes 120 into parallel query process 120A ($PQ_A$) capable of operating with processes within PDB sandbox 110A. Once completed, a privilege raising process 1112B may be employed to raise the privileges of parallel query process 120A to transform parallel query processes 120A back into parallel query process 120 capable of operating with processes situated outside PDB sandbox 110A. Thus, privilege lowering process 1112A and privilege raising process 1112B may be employed to allow temporary processes to enter and leave PDB sandboxes.

Similarly, other outside processes such as administration processes may employ privilege raising process 1112A and privilege lowering process 1112B to effectuate access to and from PDB sandbox 110A. For example, privilege raising processes 1112A and privilege lowering process 1112B may be employed to allow external daemons such as SSHD 130 to create new processes, for example login shells, such as process 134A3, configured with the appropriate access privilege level.

Figure 12:
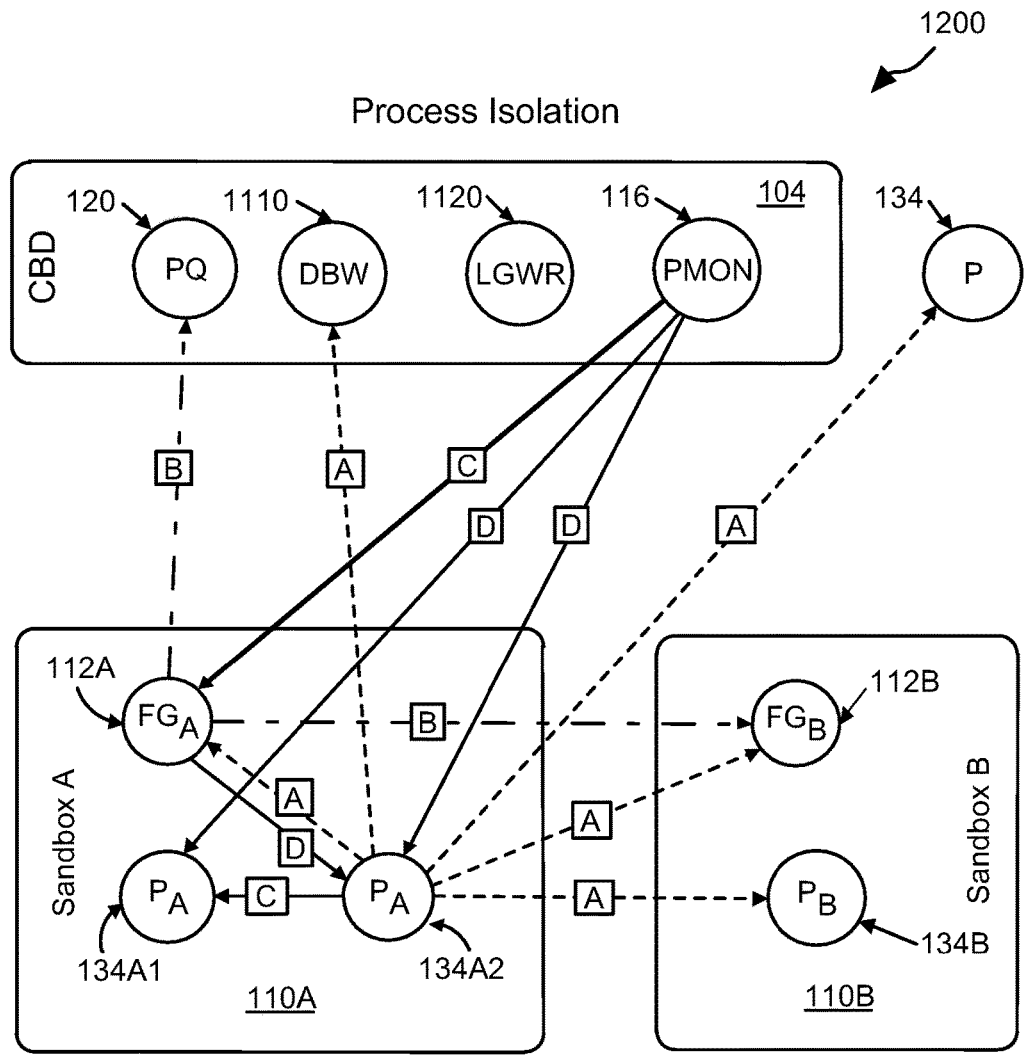
FIG. 12 is a high level illustration of PDB Sandboxing process for process isolation.

FIG. 12 is a high level illustration of a schema 1200 utilizing PDB sandboxes 110 employing a dynamic access process to regulate processes with regard to seeing, signaling, or debugging other processes. In an implementation, access processes 1210 are implemented, for example, through permissions, clearances, and the like, to regulate processes that exist inside and outside PDB sandboxes 110, to see or not see, signal or not signal, or debug or not debug other processes disposed inside and outside PDB sandboxes 110. Such access processes 1210 may be configured to set the level of access, and access directivity, in order to regulate the ability for processes to see, signal, or debug other processes disposed inside and outside PDB sandboxes 110.

As illustrated in FIG. 12, to provide multitenant system 100 with tenant security and isolation, access process 1210A (A) is configured to not allow processes situated within or external to PDB sandboxes 110A and 110B to see, signal, or debug other processes situated within or external to PDB sandboxes 110A and 110B; access process 1210B (B) is configured to not allow processes situated within or external to PDB sandboxes 110A and 110B to see or signal, but allows such processes to debug other processes situated within or external to PDB sandboxes 110A and 110B; access process 1210C (C) is configured to allow processes situated within or external to PDB sandboxes 110A and 110B to see, signal, and debug other processes situated within or external to PDB sandboxes 110A and 110; and access process 1210D (D) is configured to allow processes situated within or external to PDB sandboxes 110A and 110B to see, but not signal or debug other processes situated within or external to PDB sandboxes 110A and 110B.

In an example, access process 1210A is configured to prevent process 134A2 situated within PDB sandbox 110A from seeing, signaling, or debugging foreground process 112A, situated within PDB sandbox 110A, database writer process 1110, process 134, disposed outside PDB sandbox 110A. Further, access process 1210A (A) is configured to prevent process 134A2 from being able to see, signal, or debug foreground processes 125B (FG$_B$) and other processes 134B (PB) disposed in PDB sandbox 110B.

Access process 1210B is configured to prevent foreground process 112A disposed inside PDB sandbox 110A from seeing or signaling query slave operations 120, situated outside PDB sandbox 110A, and foreground process 110B located within PDB sandbox 110B. However, access process 1210B is configured to allow foreground process 112A to debug query slave operations 120 and foreground process 112B.

Similarly, access process 1210C is configured to allow process-monitoring process 116 (PMON) situated outside PDB sandbox 110A the ability to see, signal, and debug foreground process 112A, situated within PDB sandbox 110A. Access process 1210C is also configured to allow process 134A2 access to see, signal and debug processes 134A1, disposed within PDB sandbox 110A.

Further, access process 1210D is configured to allow process-monitoring process 116 to see, but not signal or debug process 132A1 and 134A2 situated inside PDB sandbox 110A. Access process 1210D is also configured to foreground process 112A disposed in PDB sandbox 110A, to see, but not signal or debug process 134A2, which is also disposed in PDB sandbox 110A.

Figure 13:
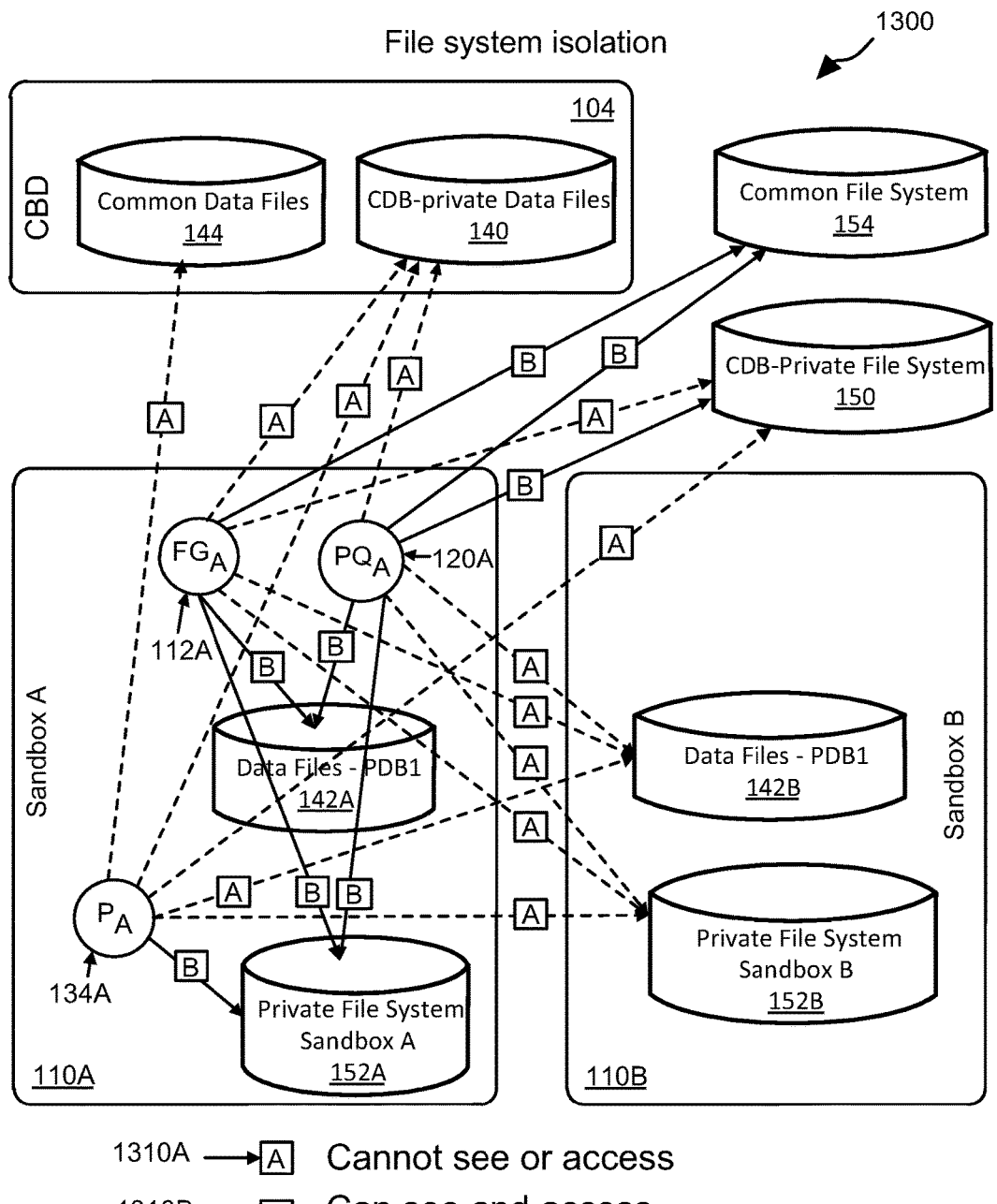
FIG. 13 is a high level illustration of PDB Sandboxing process for file system isolation.

FIG. 13 is a high level illustration of a schema 1300 for utilizing PDB sandboxes 110 to regulate processes with regard to seeing or accessing database files located inside or outside PDB sandboxes 110. In an implementation, to provide multitenant system 100 with tenant security and isolation, one or more file access processes 1310 are implemented, for example, through permissions, clearances, and the like, to regulate processes disposed inside and outside PDB sandboxes 110, to see or not see and access or not access, database and other files disposed inside and outside PDB sandboxes 110. Such file access processes 1310 may be configured to set the level of access, and access directivity, in order to regulate the ability for processes to see and access data files disposed inside and outside PDB sandboxes 110.

In an example, file access process 1310A (A) may be configured to prevent process 134A situated within PDB sandbox 110A from seeing or accessing CDB-private date files 140 and common data files 144, and CDB-Private file system files 150, situated externally to PDB sandbox 110A, and prevent process 134A from seeing or accessing PDB-private data files 142B, and PDB-private systems 152B, disposed within PDB sandbox 110B. Moreover, file access process 1310B is configured to allow process 134A the ability to see and access PDB-private system files 142A and PDB private file systems 152A, situated within PDB sandbox 110A.

Further, file access process 1310A is configured to prevent foreground process 112A, disposed within PDB sandbox 110A, from seeing or accessing CDB-private date files 140 and CDB-Private file systems 150, situated externally to PDB sandbox 110A, and prevent foreground process 112A from seeing or accessing data files 142B, and CDB private files 152B, disposed within PDB sandbox 110B. Moreover, file access process 1310B may be configured to allow foreground process 112A to see and access common file systems 154, situated outside PDB sandbox 110A, and CDB-Private file systems 152A, and see and access PDB-private system files 142A and PDB private file system 152A, situated within PDB sandbox 110A.

Figure 14:
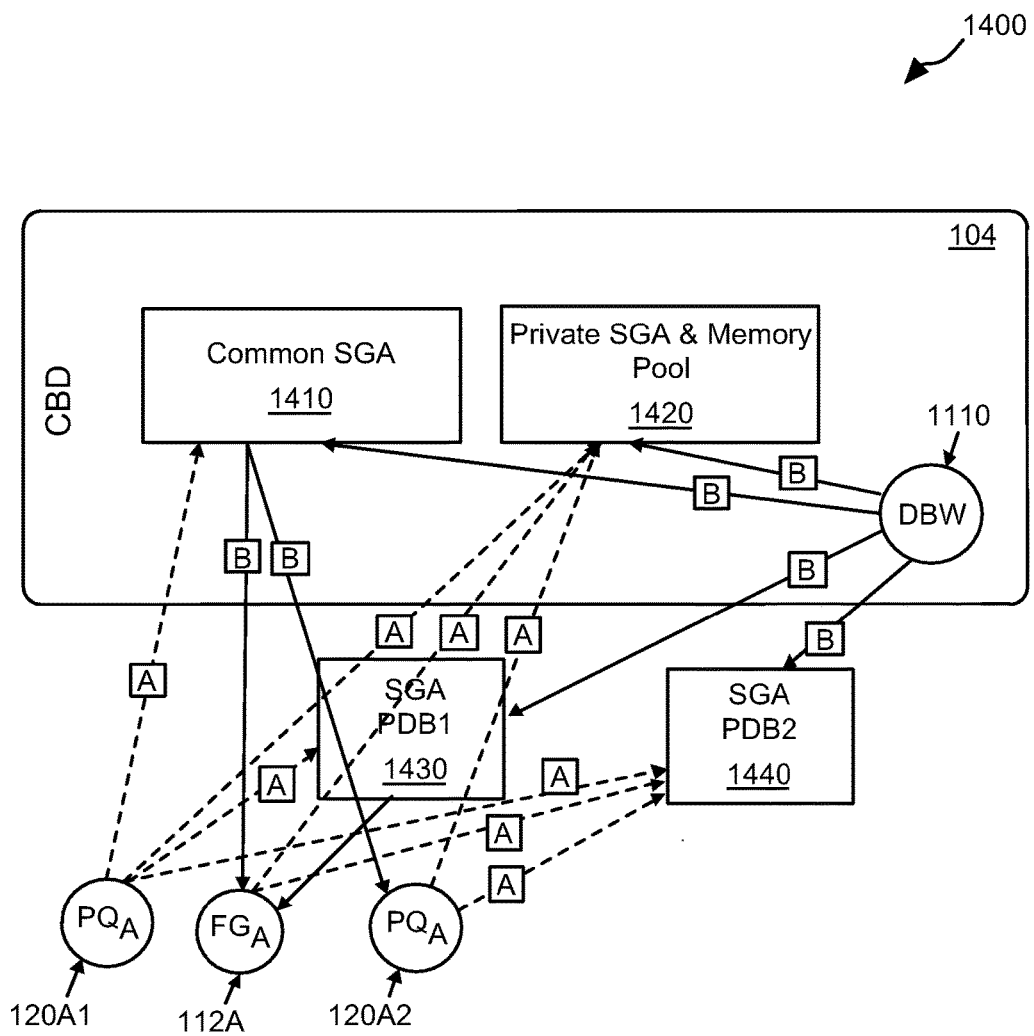
FIG. 14 is a high level illustration of PDB Sandboxing process for memory isolation.

FIG. 14 is a high level illustration of a schema 1400 for utilizing PDB sandboxes 110 to regulate processes with regard to seeing or accessing memory located inside or outside PDB sandboxes 110. In an implementation, one or more memory access processes 1410 are implemented, for example, through permissions, clearances, and the like, to regulate processes and memory disposed inside and outside PDB sandboxes 110, to see or not see, and access or not access, memory and processes disposed inside and outside PDB sandboxes 110. Such memory access processes 1410 may be configured to set the level of access, and access directivity, in order to regulate the ability for memory and processes to see and access memory and processes located, for example, within or outside CBD 104, associated with PDB sandboxes 110.

In an example, memory access process 1410A (A) may be configured to prevent parallel query slave process 120A1, situated outside CBD 104 and associated with PDB sandbox 110A, from seeing or accessing common SGA memory location 1410, private SGA and memory pool 1420, SGA 1430 associated with a first PDB (PDB1), and SGA1440 associated with a second PDB (PDB2). In addition, memory access process 1410A may be configured to prevent foreground processes 112A and parallel query slave process 120A2 situated outside CBD 104 and associated with PDB sandbox 110A, from seeing or accessing private SGA and memory pool 1420 and SGA 1440.

Memory access process 1410B (B) may be configured to allow common SGA memory location 1410 to see and access foreground process 112A and parallel query slave process 120A2. Moreover, memory access process 1410B may be configured to allow database writer 1110 to see and access common SGA 1410, private SGA and memory pool 1420, SGA 1430, and SGA 1440.

Figure 15:
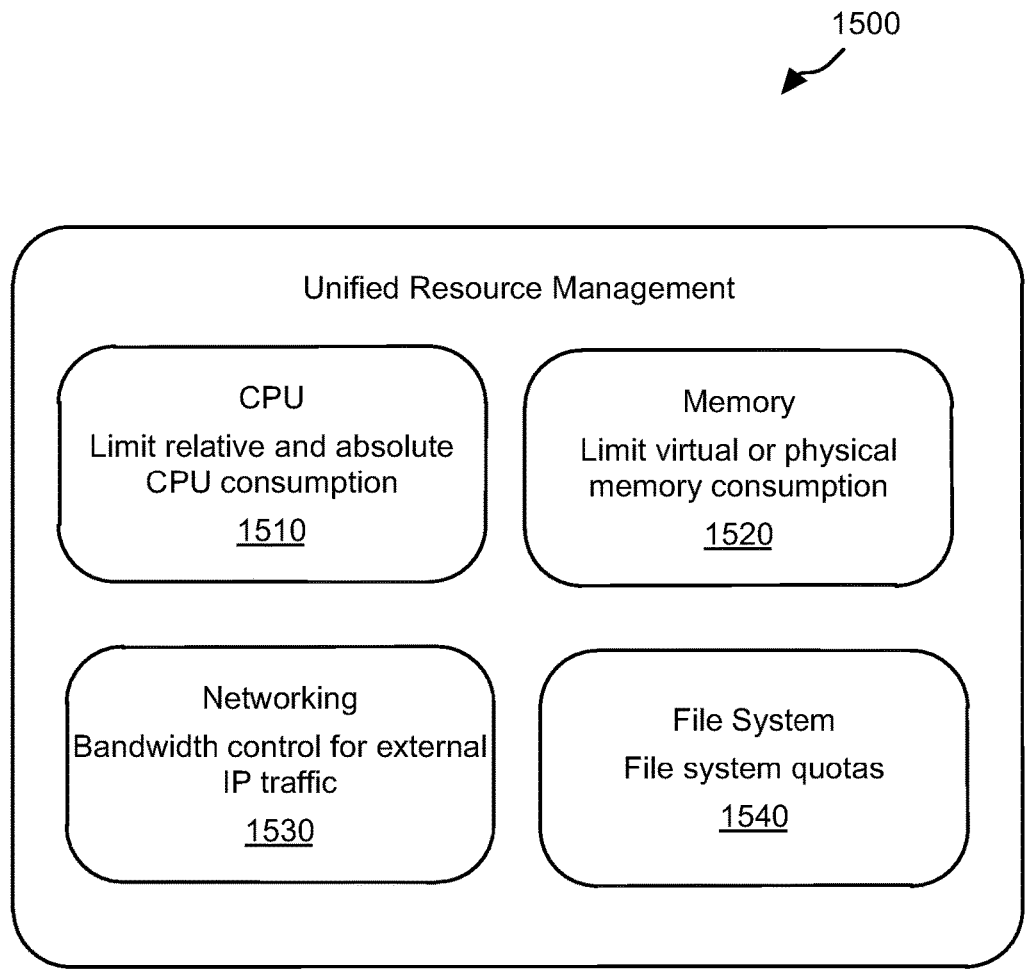
FIG. 15 is a high level illustration of PDB Sandboxing resource management.

FIG. 15 is a high level illustration 1500 of PDB Sandboxing resource management. PDB sandboxes 110 may be configured to unify CPU, memory, networking, and file systems. For example, using permission and labeling schemas as described herein, PDB sandboxes 110 may be configured to regulate relative and absolute CPU consumption 1510, limit virtual or physical memory consumption 1520, provide bandwidth control for external IP traffic 1530, and maintain file system quota 154, associated with PDB sandboxes 110.

Figure 16:
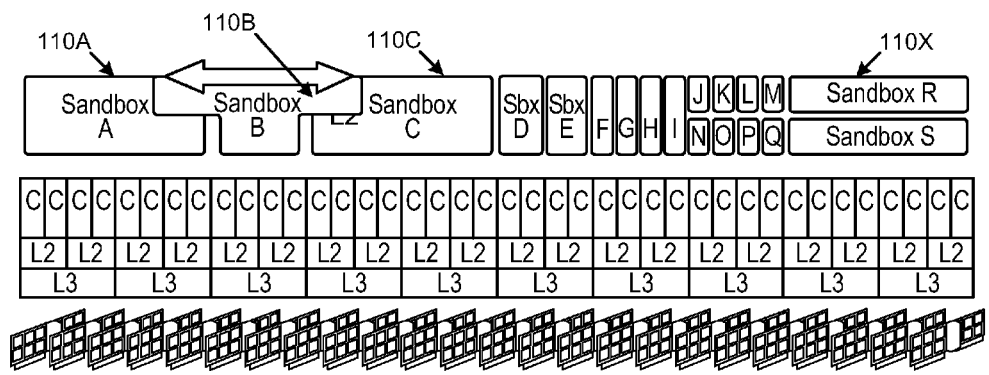
FIG. 16 is a high level illustration of PDB Sandboxing performance isolation with multiple processing cores.

FIG. 16 provides a high-level illustration 1600 utilizing PDB sandboxes 110 to adjust the level of performance isolation relative to tenant isolation needs. For example, CPU cores (C) may be grouped into a plurality of different PDB sandboxes A-S, where some of the CPUS may dynamically overlap and be used by different PDB sandboxes 110X. Arranging such overlap allows PDB sandboxing the flexibility to dynamically adjust an affinity level between PDB sandboxes 110X (e.g., PDB sandboxes A-S) in a manner to provide a variable level of isolation between PDB sandboxes 110.

Multi-CPU Binding (MCB) may be configured to allow users to bind threads to a list of CPUs (C). By binding threads of different workloads along core or socket boundaries to different cores or sockets, performance effects between workloads resulting from shared hardware components such as pipelines or caches may be reduced. MCB supports both weak and strong binding. While weak binding typically specifies a preference where to run a thread, it is still possible for the dispatcher to run it outside its preferred set of CPUs if resources are overloaded. Strong binding is fairly strict and usually runs threads where specified. MCB is not exclusive, which means binding (whether strongly or weakly) a process to a set of CPUs doesn't prevent other processes from also running on these CPUs.

Thread Affinity Groups (TAGs) provides an interface to express positive or negative affinity between threads. A positive affinity may tell the dispatcher to keep threads close together (e.g. on the same core or socket) as they might work on similar data and benefit from access to the same caches. A negative affinity may spread things out to reduce mutual interference.

Figure 17:
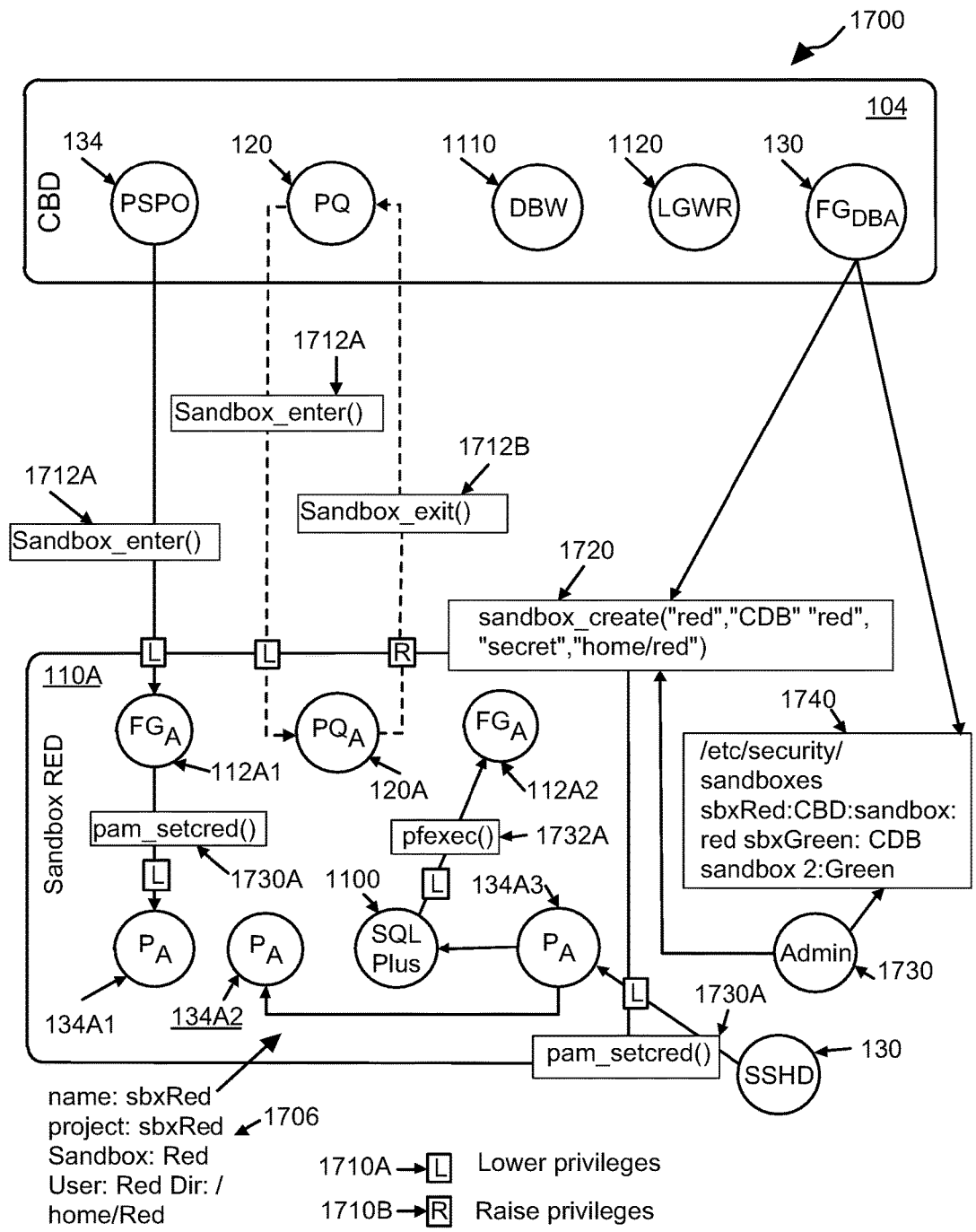
FIG. 17 is a high level illustration of a labeling system for PDB Sandboxing.

FIG. 17 is a high-level illustration of PDB sandboxes 110 employing privilege process 1700 representing a dynamic access process to effectuate multitenant system 100 security and isolation. In an implementation, privileges associated with processes are regulated using privilege raising processes 1710A and privilege lowering process 1710B implemented, for example, through permissions, credentials, clearances, and the like, to regulate whether a process may enter or leave PDB sandboxes 110. For example, privilege raising process 1710A and privilege lowering process 1710B may be employed to allow processes external and internal to PDB sandboxes 110 to enter and leave PDB sandboxes 110.

As illustrated in FIG. 17, administration process 130 may call sandbox creation process 1720 (e.g., sandbox_create ("red" "secret", "home/red) to create PDB sandbox 110A with a label 1706 describing attributes of PDB sandbox 110A such as "name:sbxRed, project:sbxRed," "Sandbox: Red," "User:Red Dir:/home/Red," etc. Similar to schema 1100 shown in FIG. 11, in FIG. 17, process spawner (PSP0) 134 spawns processes such as foreground processes 112A1 and assigns them to the PDB sandbox 110A by invoking the sandbox enter API 1712A.

In implementations, entering PDB sandboxes 110 may be accomplished through a process of restricting control, where the entering process loses access to processes outside the PDB sandbox 110. For example, to allow spawned foreground process 112A1 to enter PDB sandbox 110A, privilege lowering process 1710A may invoke API 1712A (e.g., sandbox_enter( )) to lower the privileges of foreground process 112A1, which thereby allows foreground process 112A1 to enter PDB sandbox 110A. In this example, once foreground process 112A1 privileges are lowered, foreground process 112A1 remains in PDB sandbox 110A.

When a child process is spawned from other database processes within PDB sandbox 110A, privilege lowering process 1710A may be invoked to lower the privilege of such a child process to a specified level. For example, foreground process 112A1, disposed within PDB sandbox 110A, may invoke API 1730A (e.g., pam_setcred( )) to spawn a child process 134A1, and then invoke privilege lowering process 1710A which lowers privileges of child process 134A1 to a specified level. In this illustration, lowering privileges of child process 134A1 prevents child process 134A1 from operating with other processes disposed within PDB sandbox 110A having a higher privilege level, such as processes 134A2 and 134A3, that have been set with higher privilege levels.

In another implementation, some processes, such as parallel query processes 120 may be configured to enter temporarily into PDB sandbox 110A. For example, privilege lowering process 1112A may call API 1712A to lower the privileges of parallel query process 120 to enter PDB sandbox 110A, thereby transforming parallel query processes 120 into parallel query process 120A ($PQ_A$) restricting parallel query process's 120 access to resources within PDB sandbox 110A and shared resources as defined by the privilege matrix in FIG. 2 and FIG. 3. Once parallel query process 120A is completed, privilege raising process 1117B may call API 1712B (Sandbox_exit( )) configured to raise the privileges of parallel query process 120A to allow parallel query process 120A to exit from PDB sandbox 110A thereby transforming parallel query process 120A back into parallel query process 120 situated outside PDB sandbox.

In other implementations, other processes 1100, such as "SQL Plus," situated inside PSD sandbox 110A sandbox privilege process 1710A may call API 1732A (pfexec( )) to spawn a child process 112A2 at a higher clearance than parent process 1100, but still within the sandbox 110A, to allow the child process 112A2 to communicate with and access database resources of that PDB and shared resources as defined in the permission matrixes in FIG. 2 and FIG. 3. The raising of clearance and privileges through API 1732A may be controlled through the kernel, which may be configured to allow this operation for specific processes, such as sqlplus process 1100 executed as a specified user id.

Similarly, other outside processes, such as SSHD 130, may employ privilege lowering process 1710A to effectuate access to and from PDB sandbox 110A. For example, to allow SSHD 130, disposed outside PDB sandbox 110A, to spawn process 134A3 disposed inside PDB sandbox 110A, privilege lowering processes 11710A may call sandbox access process 1730A to lower privileges of process 134A3 spawned by SSHD 130 to prevent process 134A3 from accessing other processes having higher privilege levels.

FIG. 18 is a high level illustration of PDB Sandboxing labeling system 1800. In an implementation, labeling schema 1700 discussed above may employ label system 1800 in order to regulate the access of processes and files inside and outside PDB sandboxes. In one implementation, labeling system 1800 employs labels, which include compartment bit data. The compartment bit data may be used to classify all PDB sandboxes 110, individual PDB sandboxes 110, and CDB private and common data files, and CDB private file systems. Labels and compartment bits may also be used to classify access privileges to common files, root privileges, etc.

For example, disjoint compartment bits (e.g., 0001, 0010, and 0100), may be employed to define separate PDB sandboxes 110 (e.g., PDB sandbox 110A, 110B, etc.). A common compartment bit (e.g., 1111) may be used to classify the CDB used for all PDB sandboxes 110. Moreover, separated compartment bits may be used to delineate CBS private data files, common data files, and CDB-private file systems.

FIG. 19 is a high level illustration 1900 of PDB Sandboxing example labels and clearances for use with multitenant system 100 described herein. In exemplary implementations, labels 1912 may be used to label files of categories 1910. Files 1910 additionally may have access permissions 1914. In addition, labels 1922 may be used to set the clearance of processes types 1924. These processes may additionally have a user identification (UID) 1928.

Figure 20:
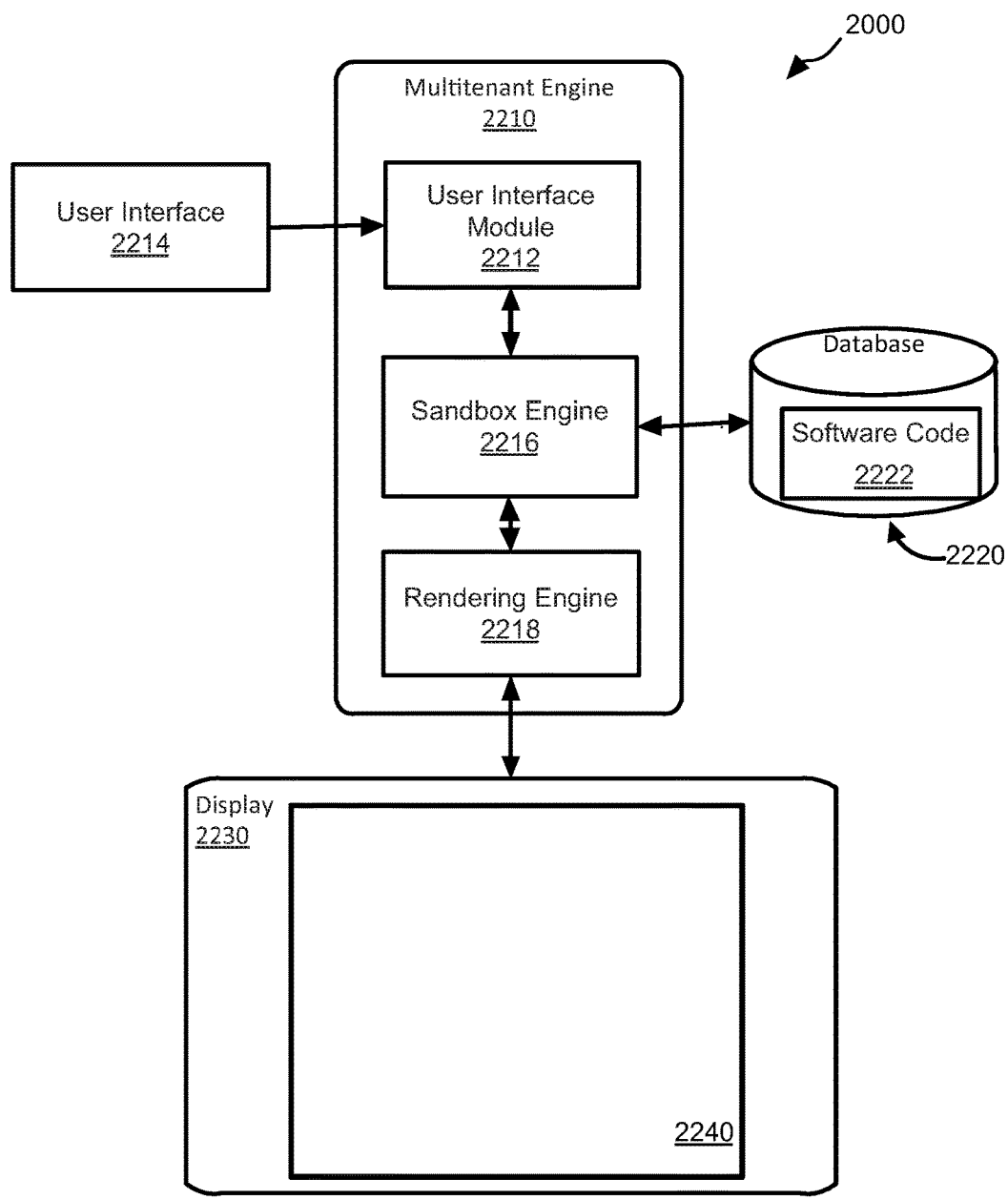
FIG. 20 is a high-level block diagram of an exemplary computing system and graphical user interface used with implementations herein.

FIG. 20 is a high-level block diagram of an exemplary computing system 2000 for PDB sandboxing. Computing system 2000 may be any computing system, such as an enterprise computing environment, client-server system, cloud network based system, and the like. Computing system 2000 includes tool 2110 configured to process data received from user interface 2114, such as a keyboard, mouse, etc., with regard to multitenant system 100, PDB sandboxes 110, analyzing data objects, data structures, metadata, and information as described herein.

Note that computing system 2000 presents a particular example implementation, where computer software code for implementing embodiments may be implemented, at least in part, on a network of servers which form a cloud data processing network. However, embodiments are not limited thereto. For example, a client-side software application may implement multitenant engine 2010, or portions thereof, in accordance with the present teachings without requiring communications between the client-side software application and one or more of the network of servers.

In one exemplary implementation, multitenant engine 2010 is connected to display 2030 configured to display a graphical user interface (GUI) 2040, for example, to a user thereof. Display 2030 may be a passive or an active display, adapted to allow a user to view and interact with graphical user interface 2040 displayed thereon, via user interface 2214. In other configurations, display 2030 may be a touch screen display responsive to touches, gestures, swipes, and the like for use in interacting with and manipulating graphical user interface 2040 by a user thereof. Gestures may include single gestures, multi-touch gestures, and other combinations of gestures and user inputs adapted to facilitate a user in migrating software code.

In other implementations, computing system 2000 may include one or more database instances 2020 such as database instance 2020A. Database instance 2020 may be connected to the multitenant engine 2010 directly or indirectly, for example via a network connection, and may be implemented as a non-transitory data structure stored on a local memory device, such as a hard drive, Solid State Drive (SSD), flash memory, and the like, or may be stored as a part of a cloud network, as described herein.

Database instances 2020 may contain software code 2022 such as software code 2022 representing software code. Software code 2022 may also include data pertinent to multitenant software such as dynamic access processes, access matrices, access processes, data structures, data hierarchy, data migration information, values, summations, algorithms, other types of code, security, hashes, and the like. In addition, software code 2022 may also contain other data, data elements, and information such as metadata, labels, development-time information, run-time information, API, interface component information, library information, pointers, and the like.

Multitenant engine 2010 may further include user interface module 2012, PDB sandbox engine 2016, and rendering engine 2018. User interface module 2012 may be configured to receive and process data signals and information received from user interface 2014. For example, user interface module 2012 may be adapted to receive and process data from user input associated with multi-tenant applications via multi-tenant engine 2010.

In an exemplary implementation, sandbox engine 2016 may be adapted to receive data from user interface 2014 and/or source database instance 2020 for processing thereof.

In one configuration, sandbox engine 2016 is a software engine configured to receive and process input data from a user thereof pertaining to graphical user interface 2040 from user interface 2014 in order to provide database, memory, and process isolation through the deployment and use of PDB sandboxes 110 as described herein.

Sandbox engine 2016 may receive source software code 2022 from database instance 2020 for processing thereof. Such software code 2022 may include and represent a composite of separate software code, listings, data objects, SQL scripts, pertaining to, for example, Human Resource Management Systems (HRMS), Financial Management Solutions (FMS), Supply Chain Management (SCM), Customer Relationship Management (CRM), Enterprise Performance Management (EPM) software, and the like.

Rendering engine 2018 may be configured to receive configuration data pertaining to graphical user interface 2040, associated software code 2022, and other data associated with graphical user interface 2040 such as user interface components, icons, user pointing device signals, and the like, used to render graphical user interface 2040 on display 2030. Rendering engine may also be configured to provide 2D and 3D visualizations to display 2030, used to display, for example, graphical user interface 2040.

Figure 21:
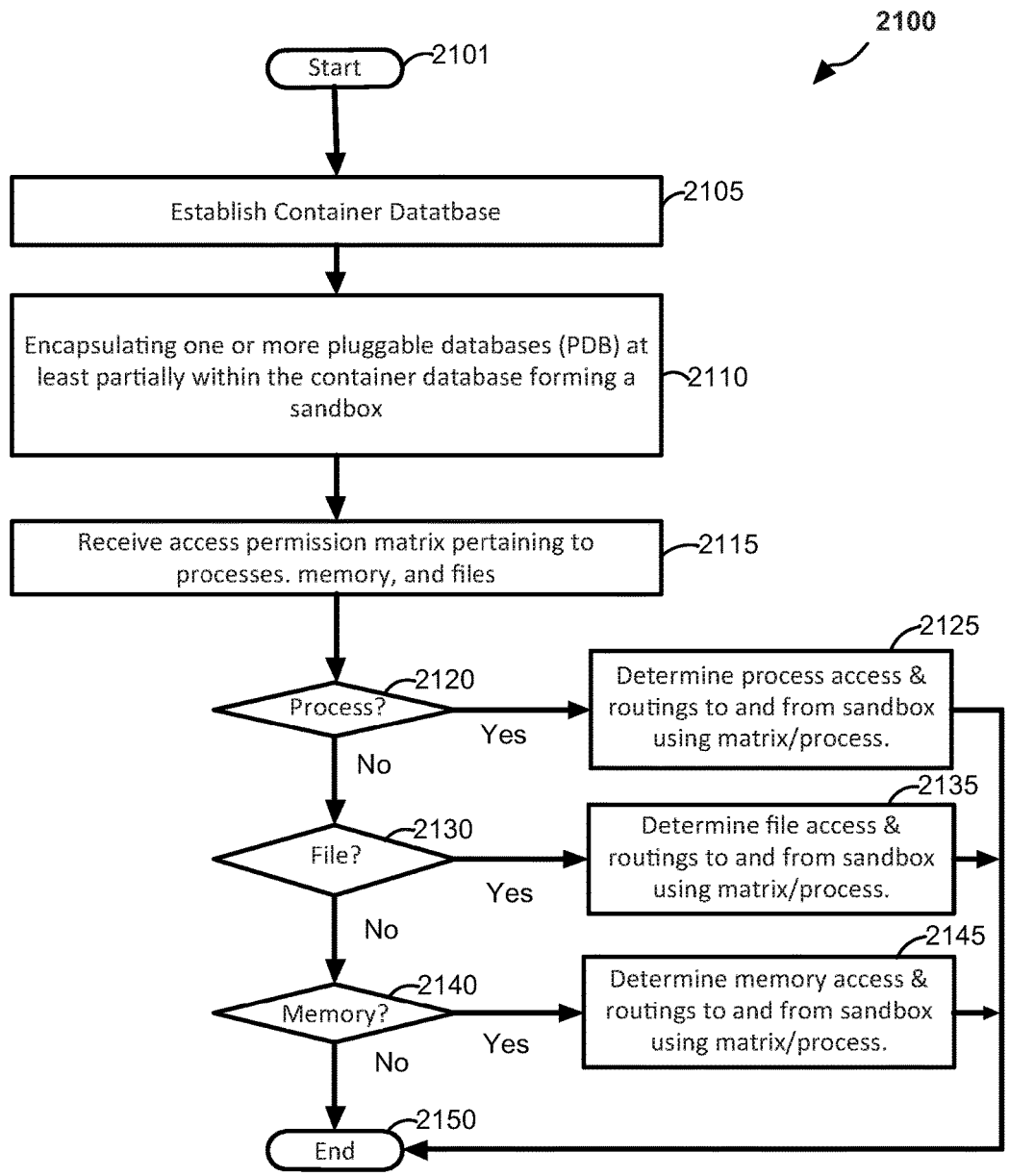
FIG. 21 is a flow diagram of an example method adapted for use with implementations, and variations thereof, illustrated in FIGS. 1-20.

FIG. 21 is a flow diagram of an example method 2100 adapted for use with implementations, and variations thereof, illustrated in FIGS. 1-20. Method 2100 may be entered into when, for example, multitenant engine 2010 is invoked for use with multitenant system 100. At 2105 method 2100 establishes CDB 104 as described herein. At 2210 method 2100 encapsulates one or more instances of PDBs to form one or more PDB sandboxes 110 with respective isolation boundary layers 118. At 2115 method 2100 receives at least one dynamic access process, which include at least one access matrix or access process configured to provide access to processes, memory, and files to and from PDB sandbox 110, as described herein. For example, as illustrated in FIGS. 1-20, dynamic access processes may be defined by access matrices and/or access process configured to provide dynamic access and routing for processes, files, and memory into, out of, and within PDB sandboxes 110. At 2120, method 2100 determines whether a process, such as foreground process 112, background process 116, job queue process 124, SSH daemon 130, and the like is being invoked, and if so proceeds to 2125. If not method 100 proceeds to 2130. At 2125, method 2100 determines access and communication to and from one or more PDB sandboxes 110, and external locations, using dynamic access processes, such as matrices and access processes as described herein. At 2130, method 2100 determines whether file access is being invoked, and if so proceeds to 2135. If not, method 2100 proceeds to 2140. At 2135, method 2100 determines files and access to and from one or more PDB sandboxes 110 and external locations using dynamic access processes, such as access matrices and processes as described herein, and ends at 2150. At 2130, method 2100 determines whether file access is being invoked, and if so proceeds to 2145. If not, method 2100 proceeds to and ends at 2150. At 2145, method 2100 determines memory access to and from one or more sandboxes and external locations using dynamic access processes, such as access matrices and processes as described herein and ends at 2150.

Figure 22:
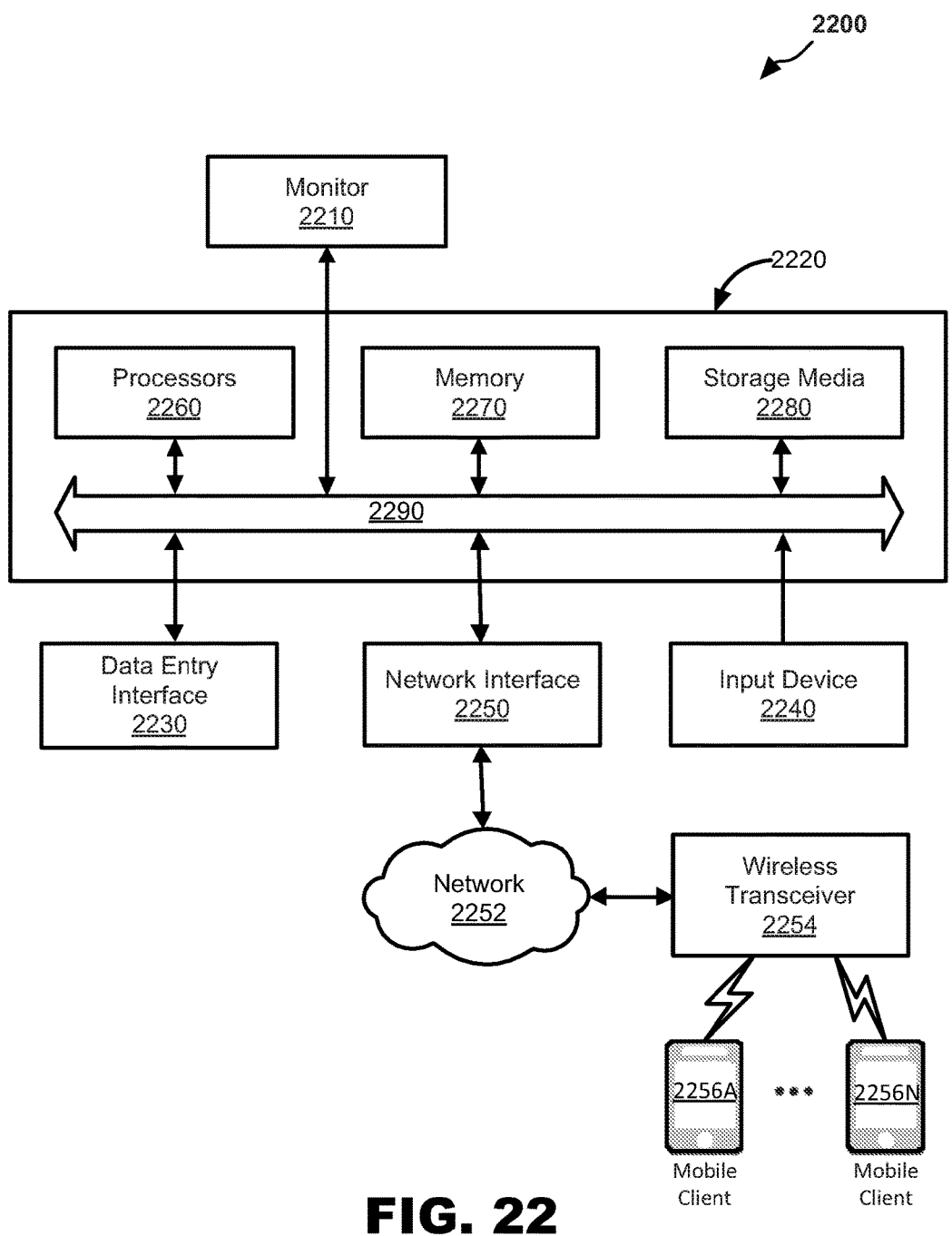
FIG. 22 is a high-level block diagram of an exemplary computer and communication system.

FIG. 22 is a block diagram of an exemplary computer system 2200 for use with implementations described in FIGS. 1-21. Computer system 2200 is merely illustrative and not intended to limit the scope of the claims. One of ordinary skill in the art would recognize other variations, modifications, and alternatives. For example, computer system 2200 may be implemented in a distributed client-server configuration having one or more client devices in communication with one or more server systems.

In one exemplary implementation, computer system 2200 includes a display device 2210 such as a monitor 2210, computer 2220, a data entry device 2230 such as a keyboard, touch device, and the like, a user input device 2240, a network communication interface 2250, and the like. User input device 2240 is typically embodied as a computer mouse, a trackball, a track pad, wireless remote, tablet, touch screen, and the like. Moreover, user input device 2240 typically allows a user to select and operate objects, icons, text, characters, and the like that appear, for example, on the monitor 2210.

Network interface 2250 typically includes an Ethernet card, a modem (telephone, satellite, cable, ISDN), (asynchronous) digital subscriber line (DSL) unit, and the like. Further, network interface 2250 may be physically integrated on the motherboard of computer 2220, may be a software program, such as soft DSL, or the like.

Computer system 2200 may also include software that enables communications over communication network 2252 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like.

Communication network 2252 may include a local area network, a wide area network, a wireless network, an Intranet, the Internet, a private network, a public network, a switched network, or any other suitable communication network, such as for example Cloud networks. Communication network 2252 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 2252 may communicate to one or more mobile wireless devices 2256A-N, such as mobile phones, tablets, and the like, via a base station such as wireless transceiver 2254.

Computer 2220 typically includes familiar computer components such as a processor 2260, and memory storage devices, such as a memory 2270, e.g., random access memory (RAM), storage media 2280, and system bus 2290 interconnecting the above components. In one embodiment, computer 2220 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 2270 and Storage media 2280 are examples of non-transitory tangible media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive.

Any suitable programming language may be used to implement the routines of particular embodiments including C, C++, Java, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. An apparatus comprising:
one or more processors; and
logic encoded in one or more non-transitory tangible media for execution by the one or more processors and when executed configured to:
establish a container database;
establish at least one pluggable database, wherein the at least one pluggable database is formed from one or more self-contained databases having a schema, a schema object, and a non-schema object;
establish an isolation boundary layer about the at least one pluggable database by encapsulating the at least one pluggable database at least partially within the container database to form an encapsulated pluggable database, wherein the isolation boundary layer includes a portion of a database associated with the container database and the encapsulated pluggable database which is configured to dynamically regulate a flow of one or more objects associated with database communication, processes, and operations, between the encapsulated pluggable database and the container database;
receive a dynamic access process configured to determine from attributes associated with the one or more objects, whether an object located on one side of the isolation boundary layer may pass through or interact with another object disposed within the encapsulated pluggable database through the isolation boundary layer;
in response to an object request to pass through the isolation boundary layer or interact with the other object, initiate the dynamic access process to dynamically determine from a first attribute associated with the object, whether the object may pass through the isolation boundary layer or interact with the other object through the isolation boundary layer; and
if the dynamic access process determines the object is allowed to pass through the isolation boundary layer or interact with the other object, in response to the object passing through the isolation boundary layer or interacting with the other object, initiate the dynamic access process to change the first access state attribute of the object from the first attribute to a second attribute, wherein the second attribute is configured to prevent the object from passing back through the isolation boundary layer or interacting with other objects through the isolation boundary layer.

2. The apparatus of claim 1, wherein the logic when executed is further configured to raise and lower permission states of the object, according to the dynamic access process in response to an input of a transition of the object through the isolation boundary layer, to regulate the passing of the object through the isolation boundary layer.

3. The apparatus of claim 1, wherein the logic when executed is further configured to change clearance levels of the object, according to the dynamic access process in response to an input of a transition of the object through the isolation boundary layer, to regulate passing of the object through the isolation boundary layer.

4. The apparatus of claim 1, wherein the logic when executed is further configured to raise and lower permission states of the object, according to the dynamic access process in response to an input of a transition of the object through the isolation boundary layer, to regulate passing of the object through the isolation boundary layer.

5. The apparatus of claim 1, wherein the logic when executed is further configured to vary clearance levels of the object, according to the dynamic access process in response to an input of a transition of the object through the isolation boundary layer, to regulate interaction between the object and the other object through the isolation boundary layer.

6. The apparatus of claim 1, wherein the object is defined by at least one of a signal, a process, a memory instruction, and file access instruction.

7. Software encoded in one or more non-transitory computer-readable media for execution by one or more processors and when executed configured to:
establish a container database;
establish at least one pluggable database, wherein the at least one pluggable database is formed from one or more self-contained databases having a schema, a schema object, and a non-schema object;
establish an isolation boundary layer about the at least one pluggable database by encapsulating the at least one pluggable database at least partially within the container database to form an encapsulated pluggable database, wherein the isolation boundary layer includes a portion of a database associated with the container database and the encapsulated pluggable database which is configured to dynamically regulate a flow of one or more objects associated with database communication, processes, and operations, between the encapsulated pluggable database and the container database;
receive a dynamic access process configured to determine from attributes associated with the one or more objects, whether an object on one side of the isolation boundary layer may pass through or interact with another object disposed within the encapsulated pluggable database through the isolation boundary layer;
in response to an object request to pass through the isolation boundary layer or interact with the other object, initiate the dynamic access process to dynamically determine from a first attribute associated with the object, whether the object may pass through the isolation boundary layer or interact with the other object through the isolation boundary layer; and
if the dynamic access process determines the object is allowed to pass through the isolation boundary layer or interact with the other object, in response to the object passing through the isolation boundary layer or interacting with the other object, initiate the dynamic access process to change the first attribute of the object from the first attribute to a second attribute, wherein the second attribute is configured to prevent the object from passing back through the isolation boundary layer or interacting with other objects through the isolation boundary layer.

8. The non-transitory computer-readable media of claim 7, wherein the software when executed is further configured to raise and lower permission states of the object, according to the dynamic access process in response to an input of a transition of the object through the isolation boundary layer, to regulate passing of the object through the isolation boundary layer.

9. The non-transitory computer-readable media of claim 7, wherein the software when executed is further configured to change clearance levels of the object, according to the dynamic access process in response to an input of a transition of the object through the isolation boundary layer, to regulate passing of the object through the isolation boundary layer.

10. The non-transitory computer-readable media of claim 7, wherein the software when executed is further configured to raise and lower permission states of the object, according to the dynamic access process in response to an input of a transition of the object through the isolation boundary layer, to regulate interaction between the object and the other object through the isolation boundary layer.

11. The non-transitory computer-readable media of claim 7, wherein the software when executed is further configured to vary clearance levels of the object, according to the dynamic access process in response to an input of a transition of the object through the isolation boundary layer, to regulate interaction between the object and the other object through the isolation boundary layer.

12. The non-transitory computer-readable media of claim 7, wherein the object is defined by at least one of a signal, a process, a memory instruction, and file access instruction.

13. A processor implemented method for controlling resource access to, from, and between one or more pluggable databases, the method comprising:
  establishing a container database;
  establishing at least one pluggable database, wherein the at least one pluggable database is formed from one or more self-contained databases having a schema, a schema object, and a non-schema object;
  establishing an isolation boundary layer about the at least one pluggable database by encapsulating the at least one pluggable database at least partially within the container database to form an encapsulated pluggable database, wherein the isolation boundary layer includes a portion of a database associated with the container database and the encapsulated pluggable database which is configured to dynamically regulate a flow of one or more objects associated with database communication, processes, and operations, between the encapsulated pluggable database and the container database;
  receiving a dynamic access process configured to determine from attributes associated with the one or more objects, whether an object located on one side of the isolation boundary layer may pass through or interact with another object disposed within the encapsulated pluggable database through the isolation boundary layer;
  in response to an object request to pass through the isolation boundary layer or interact with the other object, initiating the dynamic access process to dynamically determining from a first attribute associated with the object, whether the object may pass through the isolation boundary layer or interact with the other object through the isolation boundary layer; and
  if the dynamic access process determines the object is allowed to pass through the isolation boundary layer or interact with the other object, in response to the object passing through the isolation boundary layer or interacting with the other object, initiating the dynamic access process to change the first attribute of the object from the first attribute to a second attribute, wherein the second attribute is configured to prevent the object from passing back through the isolation boundary layer or interacting with other objects through the isolation boundary layer.

14. The method of claim 13, further comprising raising and lowering permission states of the object, according to the dynamic access process in response to an input of a transition of the object through the isolation boundary layer, to regulate passing of the object through the isolation boundary layer.

15. The method of claim 13, further comprising changing clearance levels of the object, according to the dynamic access process in response to an input of a transition of the object through the isolation boundary layer, to regulate to regulate passing of the object through the isolation boundary layer.

16. The method of claim 13, further comprising raising and lowering permission states of the object, according to the dynamic access process in response to an input of a transition of the object through the isolation boundary layer, to regulate interaction between the object and the other object through the isolation boundary layer.

17. The method of claim 13, further comprising varying interaction clearance levels of the object, according to the dynamic access process in response to an input of a transition of the object through the isolation boundary layer, to regulate interaction between the object and the other object through the isolation boundary layer.

18. The method of claim 13, wherein the object is defined by at least one of a signal, a process, a memory instruction, and file access instruction.

19. The method of claim 13, wherein the dynamic access process comprises a permission matrix.

20. The method of claim 13, wherein the dynamic access process comprises an access permission process.

* * * * *

UNITED STATES PATENT AND TRADEMARK OFFICE
CERTIFICATE OF CORRECTION

PATENT NO. : 10,178,100 B2
APPLICATION NO. : 15/013268
DATED : January 8, 2019
INVENTOR(S) : Michael et al.

Page 1 of 1

It is certified that error appears in the above-identified patent and that said Letters Patent is hereby corrected as shown below:

In the Specification

In Column 5, Line 63, delete "($FS_{cab}$)," and insert -- ($FS_{cdb}$), --, therefor.

In Column 5, Line 63, delete "($FS_C$)," and insert -- ($FS_X$), --, therefor.

In Column 15, Line 9, delete "SanboxAll,"" and insert -- SandboxAll," --, therefor.

In Column 15, Line 23, delete "Sanbox" and insert -- Sandbox --, therefor.

In Column 17, Line 41, after "710B" insert -- . --.

In the Claims

In Column 29, Line 44, in Claim 1, after "first" delete "access state".

Signed and Sealed this
Fourteenth Day of January, 2020

Andrei Iancu
*Director of the United States Patent and Trademark Office*